(12) United States Patent
Switzer et al.

(10) Patent No.: US 11,966,414 B2
(45) Date of Patent: Apr. 23, 2024

(54) SYNCHRONIZATION OF COMPONENTS OF DIGITAL ASSETS DURING LIVE CO-EDITING

(71) Applicant: Adobe Inc., San Jose, CA (US)

(72) Inventors: Stanley J Switzer, San Francisco, CA (US); Roey Horns, Seattle, WA (US); Oliver I Goldman, Seattle, WA (US); Julian R Wixson, Portland, OR (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/309,439

(22) Filed: Apr. 28, 2023

(65) Prior Publication Data

US 2023/0281223 A1 Sep. 7, 2023

Related U.S. Application Data

(63) Continuation of application No. 17/188,905, filed on Mar. 1, 2021, now Pat. No. 11,693,880, which is a (Continued)

(51) Int. Cl.
*G06F 16/00* (2019.01)
*G06F 16/22* (2019.01)
(Continued)

(52) U.S. Cl.
CPC .............. *G06F 16/27* (2019.01); *G06F 16/22* (2019.01); *G06F 16/278* (2019.01);
(Continued)

(58) Field of Classification Search
CPC ........ G06F 16/27; G06F 16/22; G06F 16/901; G06F 16/278
(Continued)

(56) References Cited

U.S. PATENT DOCUMENTS 8,489,549 B2   7/2013  Guarraci
9,251,151 B1   2/2016  Fang et al.
(Continued)

FOREIGN PATENT DOCUMENTS

CN    1169628 A      1/1998
CN    101304360 A    11/2008
(Continued)

OTHER PUBLICATIONS

Office Action as received in Chinese application 201810369218.2 dated Oct. 26, 2023.
(Continued)

*Primary Examiner* — Alexandria Y Bromell
(74) *Attorney, Agent, or Firm* — Keller Preece PLLC

(57) ABSTRACT

The present disclosure relates to a digital asset synchronization system that provides improved local and remote synchronization of digital assets. In particular, the digital asset synchronization system manages digital assets by separating each digital asset into multiple components stored as a set of distributed individual files. Employing individual components for a digital asset rather than single monolithic file enables the digital asset synchronization system to provide safe concurrent access to the digital asset from multiple applications on the same device and across different devices. In addition, using components for a digital asset provides the digital asset synchronization system with the ability to efficiently store and synchronize multiple versions of the digital asset, both locally and remotely.

20 Claims, 12 Drawing Sheets

Related U.S. Application Data continuation of application No. 15/630,740, filed on Jun. 22, 2017, now Pat. No. 10,970,302.

(51) Int. Cl.
    *G06F 16/27*     (2019.01)
    *G06F 16/901*     (2019.01)

(52) U.S. Cl.
    CPC ........ *G06F 16/901* (2019.01); *G06F 16/2272* (2019.01); *G06F 16/273* (2019.01)

(58) Field of Classification Search
    USPC ........................................................ 707/610
    See application file for complete search history.

(56) References Cited

U.S. PATENT DOCUMENTS

| | | | |
|---|---|---|---|
| 9,542,379 B1* | 1/2017 | Joshi | G06F 40/103 |
| | | | 707/707 |
| 9,727,470 B1* | 8/2017 | Cande | G06F 3/067 |
| | | | 707/707 |
| 11,023,433 B1* | 6/2021 | Datta | G06F 16/219 |
| | | | 707/707 |
| 11,635,908 B2 | 4/2023 | Switzer et al. | |
| 2001/0031102 A1 | 10/2001 | Lunetta et al. | |
| 2004/0059703 A1 | 3/2004 | Chappell et al. | |
| 2004/0205539 A1 | 10/2004 | Mak et al. | |
| 2004/0236798 A1 | 11/2004 | Srinivasan et al. | |
| 2005/0246387 A1 | 11/2005 | McChrystal | |
| 2009/0216796 A1 | 8/2009 | Slik et al. | |
| 2009/0276660 A1 | 11/2009 | Griffith et al. | |
| 2011/0016091 A1 | 1/2011 | Prahlad et al. | |
| 2011/0047252 A1 | 2/2011 | Kwapniewski et al. | |
| 2011/0161723 A1 | 6/2011 | Taleck et al. | |
| 2012/0236201 A1 | 9/2012 | Larsen et al. | |
| 2012/0254113 A1 | 10/2012 | Theroux et al. | |
| 2013/0103786 A1 | 4/2013 | Miglore | |
| 2013/0226876 A1 | 8/2013 | Gati et al. | |
| 2013/0262419 A1 | 10/2013 | Kilian et al. | |
| 2014/0156663 A1 | 6/2014 | Rhyu et al. | |
| 2014/0280272 A1 | 9/2014 | Choque et al. | |
| 2014/0281809 A1 | 9/2014 | Billa et al. | |
| 2015/0113326 A1 | 4/2015 | Talagala et al. | |
| 2015/0186431 A1 | 7/2015 | Macchietti et al. | |
| 2015/0227597 A1* | 8/2015 | Ng | G06F 16/254 |
| | | | 707/602 |
| 2015/0358375 A1 | 12/2015 | Coburn, IV et al. | |
| 2016/0034433 A1 | 2/2016 | Yamat et al. | |
| 2016/0085769 A1* | 3/2016 | Penangwala | G06F 16/178 |
| | | | 707/610 |
| 2016/0162370 A1* | 6/2016 | Mehta | G06F 16/162 |
| | | | 707/610 |
| 2016/0253352 A1 | 9/2016 | Kluck et al. | |
| 2016/0267125 A1 | 9/2016 | Tsofi et al. | |
| 2016/0283049 A1 | 9/2016 | Faydi et al. | |
| 2016/0328223 A1 | 11/2016 | Giri et al. | |
| 2016/0344771 A1 | 11/2016 | Xuan et al. | |
| 2017/0322936 A1 | 11/2017 | Davis | |
| 2018/0129715 A1 | 5/2018 | Standefer, III et al. | |
| 2018/0332320 A1 | 11/2018 | Barkley et al. | |
| 2018/0373434 A1 | 12/2018 | Switzer et al. | |
| 2018/0373770 A1 | 12/2018 | Switzer et al. | |
| 2019/0266054 A1 | 8/2019 | Kumarasamy et al. | |
| 2019/0268412 A1 | 8/2019 | Kung | |
| 2019/0273729 A1 | 9/2019 | Adler et al. | |
| 2019/0340166 A1 | 11/2019 | Raman et al. | |

FOREIGN PATENT DOCUMENTS

| | | |
|---|---|---|
| CN | 102770854 A | 11/2012 |
| CN | 104050216 A | 9/2014 |
| CN | 104050217 | 9/2014 |
| CN | 104885076 A | 9/2015 |
| CN | 106663089 A | 5/2017 |
| CN | 106686411 A | 5/2017 |
| CN | 108055131 A | 5/2018 |
| WO | WO 2014-113196 A1 | 7/2014 |
| WO | WO 2017-080428 A1 | 5/2017 |

OTHER PUBLICATIONS

Examination Report as received in United Kingdom Application GB1806343.8 dated Nov. 1, 2018.
Examination Report as received in United Kingdom Application GB1806343.8 dated May 13, 2020.
Examination Report as received in Australian application 2019213367 dated Oct. 1, 2021.
Examination Report as received in Australian application 2018202510 dated Nov. 2, 2021.
Examination Report as received in Australian application 2018202512 dated Nov. 2, 2021.
Examination Report as received in Australian application 2018202510 dated Jan. 5, 2022.
Notice of Acceptance as received in Australian Application 2018202512 dated Jan. 13, 2022.
Search Report as received in GB1806362.8 dated Nov. 8, 2018.
Combined Search and Examination Report as received in UK application GB1911474.3 dated Jan. 20, 2020.
Intention to Grant as received in UK application GB1806343.8 dated Oct. 14, 2020.
Intention to Grant as received in UK application GB1911474.3 dated Jan. 15, 2021.
L. Lessig, Remix: Making Art and Commerce Thrive in the Hybrid Economy, Penguin Books, Oct. 2008.
About the Licenses, Creative Commons, [online], http://creativecommons.org/licenses/.
I. Jacobs, N. Walsh, "Architecture of the World Wide Web, Volume One", (World Wide Web Consortium), 2004 [online], http://www.w3.org/TR/webarch/.
The JSON Data Interchange Format, Geneva: ECMA International, Oct. 2013.
N. Freed, N. Borenstein, "Multipurpose Internet Mail Extensions (MIME) Part Two: Media Types", 1996 [online], http://tools.ietf.org/html/rfc2046.
M. Nottingham, "Web Linking", 2010 [online], http://tools.ietf.org/html/rfc5988.
T. Berners-Lee, R. Fielding, L. Masinter, "Uniform Resource Identifier (URI): Generic Syntax", 2005 [online], http://tools.ietf.org/html/rfc3986.
Extensible Metadata Platform (XMP) Specification: Part 1, Data Model, Serialization, and Core Properties. Adobe, Apr. 2012.
XMP, Creative Commons Wiki, [online], https://wiki.creativecommons.org/XMP.
Dropbox: Looking Inside the Protocol Behind File Synchronization, Ixia Blog, Aug. 2014 [online], http://blogs.ixiacom.com/ixia-blog/dropbox-looking-inside-the-protocol-behind-file-synchronization/.
Evernote Synchronization via EDAM, Home—Evernote Developers, Jan. 2013 [online], https://dev.evernote.com/media/pdf/edam-sync.pdf.
L. Dusseault, Ed., "HTTP Extensions for Web Distributed Authoring and Versioning (WebDAV)", 2007 [online], http://tools.ietf.org/html/rfc4918.
R. Fielding, J. Gettys, J. Mogul, H. Frystyk, L. Masinter, P. Leach, T. Berners-Lee, "Hypertext Transfer Protocol—HTTP/1.1", 1999 [online], http://tools.ietf.org/html/rfc2616.
S.Chacon, ProGit, Apress, Aug. 2009.
Oracle, Fusion Middleware User's Guide for Oracle Business Rules, 2013 [retrieved from internet Dec. 14, 2020][<URL:https://docs.oracle.com/cd/E 1283901/user.1111/e10228/toc.htnn>] (Year: 2013); Part 1.
Oracle, Fusion Middleware User's Guide for Oracle Business Rules, 2013 [retrieved from internet Dec. 14, 2020][<URL:https://docs.oracle.com/cd/E 1283901/user.1111/e10228/toc.htnn>] (Year: 2013); Part 2.
Goldman, Oliver, et al. "Digital composites: Technology for creativity in a cloud-connected world." 2015 Internet Technologies and

(56) References Cited

OTHER PUBLICATIONS

Applications (ITA). IEEE, 2015 [retrieved from internet Sep. 17, 2021][<URL:https://ieeexplore.ieee.org/starnp/starnp.jsp?arnurnber 7317385>] (Year: 2015).
Notice of Grant as received in Australian application 2019213367 dated Feb. 24, 2022.
Klotz M; How good is the map? A multi-scale cross-comparison framework for global settlement layers: Evidence from Central Europe; Elsevier; 2016; p. 191-212 (Year: 2016).
Office Action as received in CN201810368908.6 dated Mar. 1, 2023.
Office Action as received in Chinese application 201810369218.2 dated Apr. 8, 2023.
U.S. Appl. No. 15/630,767, filed May 6, 2019, Office Action.
U.S. Appl. No. 15/630,767, filed Nov. 25, 2019, Office Action.
U.S. Appl. No. 15/630,767, filed May 18, 2020, Office Action.
U.S. Appl. No. 15/630,767, filed Oct. 7, 2020, Office Action.
U.S. Appl. No. 15/630,767, filed May 5, 2021, Office Action.
U.S. Appl. No. 15/630,767, filed Nov. 5, 2021, Office Action.
U.S. Appl. No. 15/630,767, filed May 18, 2022, Office Action.
U.S. Appl. No. 15/630,767, filed Dec. 23, 2022, Notice of Allowance.
U.S. Appl. No. 15/630,740, filed Sep. 26, 2019, Preinterview 1st Office Action.
U.S. Appl. No. 15/630,740, filed Feb. 5, 2020, Office Action.
U.S. Appl. No. 15/630,740, filed Jun. 18, 2020, Office Action.
U.S. Appl. No. 15/630,740, filed Nov. 30, 2020, Notice of Allowance.
U.S. Appl. No. 16/291,677, filed Mar. 20, 2020, Preinterview 1st Office Action.
U.S. Appl. No. 16/291,677, filed May 28, 2020, Office Action.
U.S. Appl. No. 16/291,677, filed Aug. 18, 2020, Office Action.
U.S. Appl. No. 16/291,677, filed Dec. 18, 2020, Office Action.
U.S. Appl. No. 16/291,677, filed May 11, 2021, Office Action.
U.S. Appl. No. 16/291,677, filed Oct. 12, 2021, Office Action.
U.S. Appl. No. 16/291,677, filed Dec. 24, 2021, Notice of Allowance.
U.S. Appl. No. 17/188,905, filed Nov. 10, 2022, Office Action.
U.S. Appl. No. 17/188,905, filed Jan. 30, 2023, Notice of Allowance.
U.S. Appl. No. 18/298,652, filed Dec. 7, 2023, Office Action.
Office Action as received in Chinese application 201810369218.2 dated Nov. 30, 2023.
Notice of Allowance and Search Report received in CN application No. 201801369218.2 dated Feb. 21, 2024.
Office Action as received in CN Application No. 201910683766.7 dated Feb. 1, 2024.

* cited by examiner

SYNCHRONIZATION OF COMPONENTS OF DIGITAL ASSETS DURING LIVE CO-EDITING

CROSS-REFERENCE TO RELATED APPLICATIONS

The present application is a continuation of U.S. application Ser. No. 17/188,905, filed on Mar. 1, 2021, which is a continuation of U.S. application Ser. No. 15/630,740, filed on Jun. 22, 2017, now issued as U.S. Pat. No. 10,970,302. Each of the aforementioned applications is hereby incorporated by reference in its entirety.

BACKGROUND

The advent of computers and computer technologies has provided numerous benefits to individuals. Some of these benefits include the ability to store files on web-based severs to allow access from multiple devices or by multiple users. For example, various file management systems enable an individual, or a group of individuals, to synchronize files across multiple client devices as well as access their files on the cloud (e.g., via the Internet). Despite these and other advantages, conventional file management systems, however, still present several drawbacks.

As one example drawback, conventional file management systems often limit an individual's ability to access a file from multiple locations, particularly if the individual is trying to edit the file at more than one location. For example, conventional file management systems often prevent an individual from modifying a file at one location if the file is also being accessed in another location. Rather, the conventional file management systems limit the individual to read-only at one or each of the locations.

In some cases, when an individual attempts to simultaneously access a file from a second location, many conventional file management systems require that the individual create a duplicate copy of the file before the individual can make any changes to the file. The practice of creating duplicate copies creates several problems. For example, creating a copy doubles the amount of storage needed to store the file. This includes doubling the amount of storage at each location where the files are stored.

Further, by creating copies of a file, conventional file management systems waste bandwidth transmitting file copies. For instance, when a copy is created on a client device, the client device transmits a full copy of the file to the remote storage location. Further, if the file is synchronized to additional devices, the file management system then transmits the copy of the file to each of those locations. As the size of the file increases, the amount of wasted bandwidth also increases.

As another example, creating a file copy untethers the copy from the original file. For instance, by having multiple copies of a file (e.g., the file and the copy), an individual can easily become confused as to which file is the most current file. For example, if one or more copies of the file include modifications, an individual is left on their own to figure out which copies contain which modifications, whether to merge modifications between multiple copies, and/or whether to delete one or more copies as a duplicate or outdated version. Further, these file copies clutter up the individual's client device (e.g., multiple copies of the same file begin to appear in folders and directories). As a result, individuals are confused as to what to do with each file copy, and in some cases, incorrectly remove a file that included correct revisions.

Accordingly, these along with additional problems and issues exist with regard to conventional file management systems. Hence, there remains a need for an improvement in the area of file management within a computing device as well as between computing devices.

BRIEF SUMMARY

One or more embodiments of the present disclosure include systems and methods that provide improved local and remote synchronization of digital assets. In particular, in one or more embodiments, the systems and methods manage digital assets by separating each digital asset (a digital image, file, etc.) into intrinsic components that make up the digital asset (layers, pages, etc.) and storing the components as separate individual files. This allows the methods and systems to store and synchronize the components individually rather that the entire digital assets when changes are made to the digital asset.

A component includes content within a defined boundary of a digital asset and is modifiable without affecting other components of the digital asset, such as a layer of an image or a page of a document. The systems and methods assign identifiers to each component. Using the identifiers, the systems and methods generate a database mapping that connects each component to the corresponding file, where the mapping indicates the version of the digital asset. In some example embodiments, the disclosed systems and methods detect an update to a component of the digital asset. For example, an application makes a modification to the component. In response to detecting the update, the systems and methods store an updated file for the updated component as well as assign an identifier to the updated component. The systems and methods then generate a modified mapping that replaces the original identifier of the component with the updated identifier of the updated component. In this manner, the modified mapping denotes the updated version of the digital asset, which includes the modification to the component. In addition, when the digital asset is stored on another client device, the systems and methods need only send the updated component and the modified mapping to the other client device to provide the other device with the updated version of the digital asset rather than sending the entire updated file to the other client device.

These and additional features and advantages of one or more embodiments of the present disclosure are outlined in the description which follows, and in part will be obvious from the description, or may be learned by the practice of such example embodiments.

BRIEF DESCRIPTION OF THE DRAWINGS

The disclosure describes one or more embodiments with additional specificity and detail through the use of the accompanying drawings, as briefly described below.

DETAILED DESCRIPTION

Figure 1:
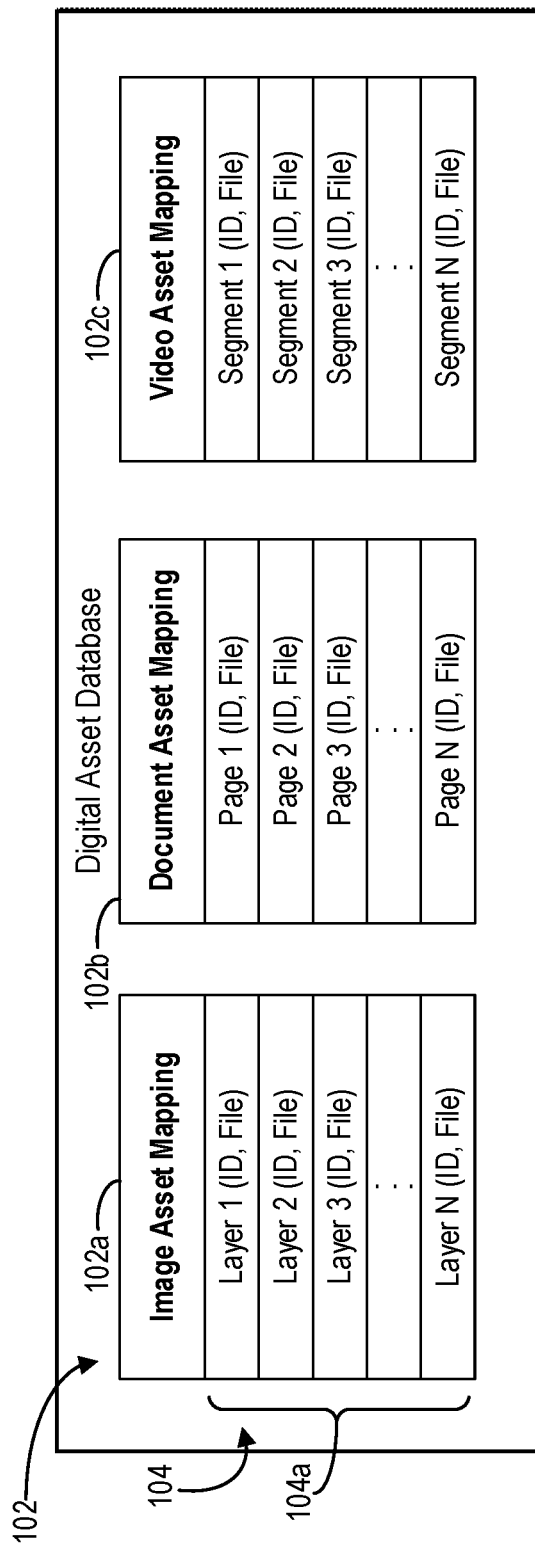
FIG. 1 illustrates an example digital asset database that includes digital asset mappings in accordance with one or more embodiments.

One or more embodiments of the present disclosure include a digital asset synchronization system that provides improved local and remote synchronization of digital assets. In particular, the digital asset synchronization system manages digital assets by separating each digital asset into its intrinsic components and storing/synchronizing the components individually rather that the entire digital assets. To demonstrate, in one or more embodiments, the digital asset synchronization system identifies components of a digital asset. Upon identifying the components of a digital asset, the digital asset synchronization system assigns identifiers that uniquely identify each component. The digital asset synchronization system stores each of the components of the digital asset as an independent file. In other words, the digital asset synchronization system stores components of a digital asset individually rather than storing all the components of a digital asset together as a monolithic file. The digital asset synchronization system then using the mapping to compile the individual components to provide an application access to the digital asset. When a component is modified, the digital asset synchronization system, stores an updated version of the component and syncs the updated version of the component rather than storing and synchronizing an updated version of the entire digital asset.

Continuing the above example, upon detecting the update to the component, the digital asset synchronization system creates a copy of the component (e.g., a new independent file) having the modification. In addition, the digital asset synchronization system assigns an identifier to the modified component. The digital asset synchronization system then generates a modified mapping that replaces the identifier of the original component in the original mapping with the identifier of the modified component. In this manner, the original mapping represents the previous version of the digital asset, and the modified mapping represents the updated version of the digital asset. Further, because the only difference between the two versions of the digital asset is a single modified component, the digital asset synchronization system reuses, without creating a copy of the other components of the digital asset to maintain the two versions.

Along similar lines, the digital asset synchronization system needs only to send the newly created component and the modified mapping to other devices to provide the devices with the updated version of the digital asset. Sending only modified components rather than an entire modified copy of the digital asset significantly reduces the bandwidth needed to sync updates to the digital asset across devices. In addition, the other devices can replace the mapping with the modified mapping and the original component with the modified component. Further, the other devices can remove the previous mapping along with the original component, or keep both sets to maintain a version history of the digital asset.

By employing a component framework for each digital asset, the digital asset synchronization system can enable multiple applications on the same or different client devices to simultaneously access the same digital asset without requiring each application to create a separate copy of the entire digital asset. For example, if the two applications are on the same device, both applications use the same digital asset database to access and display the digital asset. Then, when one application modifies a component of the digital asset, the digital asset synchronization system provides the updated component to the other application via the digital asset database. When the two applications are remote from each other, each application interfaces with a digital asset database, which provides each other with component updates. In other words, when the digital asset synchronization system sends a modified component from a local digital asset database to a remote digital asset database, any applications using the remote digital asset database automatically receive the modified component.

In one or more embodiments, when two applications (either local or remote to each other) access components of a digital asset, the two applications may modify different components at the same time. For example, two users are each using an application to modify a different component within their respective applications. However, in some embodiments, the digital asset synchronization system detects a conflict between different versions of the same component of a digital asset. In these embodiments, the digital asset synchronization system stores the different versions of the component as separate files and the digital asset synchronization system adds the two or more versions to the same mapping, often in place of the original base component.

Upon updating the mapping to include each branch of the component, an application presents the modified digital asset to a user. The user, within the application, can easily discern that two (or more) separate components that have been added to the digital asset. In addition, the user can quickly remove or merge the component(s) added to the digital asset to arrive at the correctly modified digital asset. Alternatively, if desired, the digital asset synchronization system enables the user can easily revert to the previous versions of the component/digital asset.

As mentioned above, the digital asset synchronization system in one or more embodiments interfaces with a remote digital asset database. For example, the digital asset synchronization system communicates with a remote digital asset database to maintain an up-to-date version of a digital asset on a local client device, in a cloud storage location, and/or on other client devices. As the digital asset synchronization system detects updates to components on the local client device, the digital asset synchronization system can provide the updated components to the remote digital asset database, which can then distribute the updated components to the other client device(s).

In some embodiments, a client device is not continuously connected to the remote digital asset database. For example, a client device that is a mobile device can intermittently connect to networks. In these embodiments, a user may perform a number of modifications to a single component on a local client device while the client device is offline from the remote digital asset database. While offline, the digital asset synchronization system can record each modification to the component. When the client device again connects with the remote digital asset database, the digital asset synchronization system provides the remote digital asset database with a copy of each of modified component. In turn, the remote digital asset database generates a version mapping of the digital asset for each received modification and associates each version mapping with a previous version of the digital asset.

As briefly described above, the digital asset synchronization system provides many advantages over conventional file management systems. For example, the digital asset synchronization system provides increased flexibility and improved computing functionality by enabling simultaneous access and editing of the same digital asset by multiple users, applications, and/or devices. When the digital asset synchronization system detects a change in one component of a digital asset, the digital asset synchronization system automatically propagates the change to other users, applications, and/or devices simultaneously accessing the digital asset. Conventional systems and methods typically do not enable simultaneous access and editing of the same digital asset by multiple users, applications, and/or devices. Furthermore, when a conflict with a component is detected, the digital asset synchronization system intelligently resolves the conflict as described in greater detail below.

In addition, the digital asset synchronization system enables a computing device to perform functions faster than conventional file management systems. In particular, the digital asset synchronization system can utilize the efficiencies gained by synchronizing only modified components of a digital asset rather than synchronizing the entire digital asset. As detailed herein, the digital asset synchronization system provides improved efficiencies to a client device by reducing the computing resources needed by the client device to synchronize and store a digital asset. Further, the digital asset synchronization system provides faster access to (e.g., faster search) and presentation of the digital asset, which results in the digital asset synchronization system improving the functionality of the client device itself (e.g., the digital asset synchronization system accesses, displays, and edits digital asset faster than conventional systems and methods).

As an additional advantage, the digital asset synchronization system provides bandwidth efficient synchronization between devices such that only a fraction of a digital asset is transmitted when a modification occurs. Further, the digital asset synchronization system enables maintaining numerous versions of a digital asset, both locally and remotely, with little additional storage cost, unlike conventional file management systems, which require saving full copies each version of a digital asset.

Further, as a result of the digital asset synchronization system providing simultaneous access to components between applications on a client device, the individual applications do not need to provide inter-process communications (IPC) when a component changes within the application. Rather, the digital asset synchronization system detects, manages, and coordinates the modified component across multiple applications. This feature is particularly relevant in sandboxed systems and similar environments, where applications are prevented from using IPC to communication with other applications on a client device.

Moreover, the digital asset synchronization system provides improved flexibility by enabling the digital asset synchronization system to operate with a range of digital assets, regardless of their type (e.g., images, documents, presentations, videos, animations, infographics, and other types). Additional benefits, advantages, features, and characteristics of the digital asset synchronization system are described below with respect to the figures, which describe one or more embodiments of the digital asset synchronization system.

Referring now to the Figures, FIG. 1 illustrates example components belonging to corresponding digital assets, linked by a digital asset database. In particular, FIG. 1 illustrates a digital asset database 100 that includes multiple digital asset mappings 102 (or simply "mappings 102"). As shown, the digital asset database 100 includes an image asset mapping 102a, a document asset mapping 102b, and a digital video asset mapping 102c. The digital asset database 100 can be located on a client device or a server device, as described further below.

As an overview, and mentioned above, the term "digital asset," as used herein, generally refers to digital data having a corresponding right to use. For instance, a user is authorized to create, view, modify, and/or delete a digital asset. Examples of a digital asset, include but are not limited to, documents such as word documents, spreadsheets, and presentations; electronic messages; images such as illustrations, animations, and photographs; videos; audio content; three-dimensional data; and other digital data that a user can transmit between computing devices.

The term "component" refers to a portion of a digital asset. A particular set of components makes up a digital asset (e.g., a digital asset version). In general, each component of a digital asset is modifiable without affecting other components of the digital asset. In some instances, however, a limited number of components are linked, and changes to one component affect a few other components. In addition, the style (e.g., framework) of a component is based on boundaries within a digital asset, and is often based on the digital asset's type. For example, an image includes layers and sub-layers as components; a video or video project includes shorter video segments, titles, and static graphics as components; a document includes pages, canvases, artboards, text and image boxes, rows, columns, and/or graphics as components; and a three-dimensional model includes meshes, maps, scenes, and skins as components. In other cases, a user can select the boundaries/parameters for components of a digital asset.

Each component is associated with an independent file. As used herein, the term "independent file" (or simply "file") generally refers to digital data individually recorded in a storage medium. As such, one file can be accessed, modified, transmitted, and/or removed separately from other data files. Because components are discrete portions of a digital asset, each component can be stored on a computing device as an individual file, in a file location or directory that is not dependent on where other components of the digital asset are stored. Thus, in contrast to a monolithic file, which stores all data belonging to the file in a single location, components of a digital asset can be stored as files distributed across a storage medium (e.g., a local database or cloud storage), such as on one or more client devices and/or remote server devices.

Returning to FIG. 1, the digital asset synchronization system uses one of the mappings 102 within the digital asset database to access one or more digital assets. To demonstrate, each mapping includes a listing of components 104 that make up a digital asset. In some embodiments, a mapping defines an order, priority, or arrangement of components of the digital asset, as described below. As an example mapping, the image asset mapping 102a includes layer components 104a that belong to a digital image asset. In this manner, the digital asset synchronization system uses the image asset mapping 102a to access each of the layer components 104a of the digital image asset. As a note, while FIG. 1 simply labels components belonging to the image asset mapping 102a, one will appreciate that the description provided with regard to the layer components 104a likewise apply to other components belonging to other digital assets.

As mentioned above, in many embodiments, the style (e.g., framework) of a component is based on a digital asset's type to which the component belongs. As one example, a digital image has the component framework of layers, which include both visible layers and non-visible layers (e.g., layers that include metadata about the image). Other examples of components being based on a digital asset's type are provided above.

As shown in FIG. 1, each of the layer components 104a includes an identifier ("ID") and a file location ("File"). In general, an identifier uniquely labels each component that makes up a digital asset. The digital asset synchronization system uses the identifiers to list which layers to include in the image asset mapping 102a for a digital image. In other words, the image asset mapping 102a lists the identifiers of the layers that make up the digital image. Additional detail regarding the digital asset synchronization system assigning identifiers for a digital asset is provided below.

Generally, the file location associated with each of the components links the component's identifier to the component's file. As mentioned above, the files store data for components of a digital asset can be distributed across a storage medium. For example, some files are stored in one directory (e.g., a folder) while other files are stored in another directory. In another example, some files are stored in cloud storage. As such, the digital asset database 100 maintains a record (i.e., the file location) of where the file for a component in a mapping 102 is stored. In this manner, the digital asset synchronization system uses a mapping for a digital asset to identify where files for the digital asset are located, as the files could be located in various locations within a storage medium.

In one or more embodiments, the digital asset synchronization system performs a step for mapping an identifier for each of the components to a distributed file associated with the component. As mentioned above, and as further described below, the digital asset synchronization system generates the mapping 102 by linking identifiers for each component of a digital asset to an independent file that includes the contents of a corresponding component.

Figure 2:
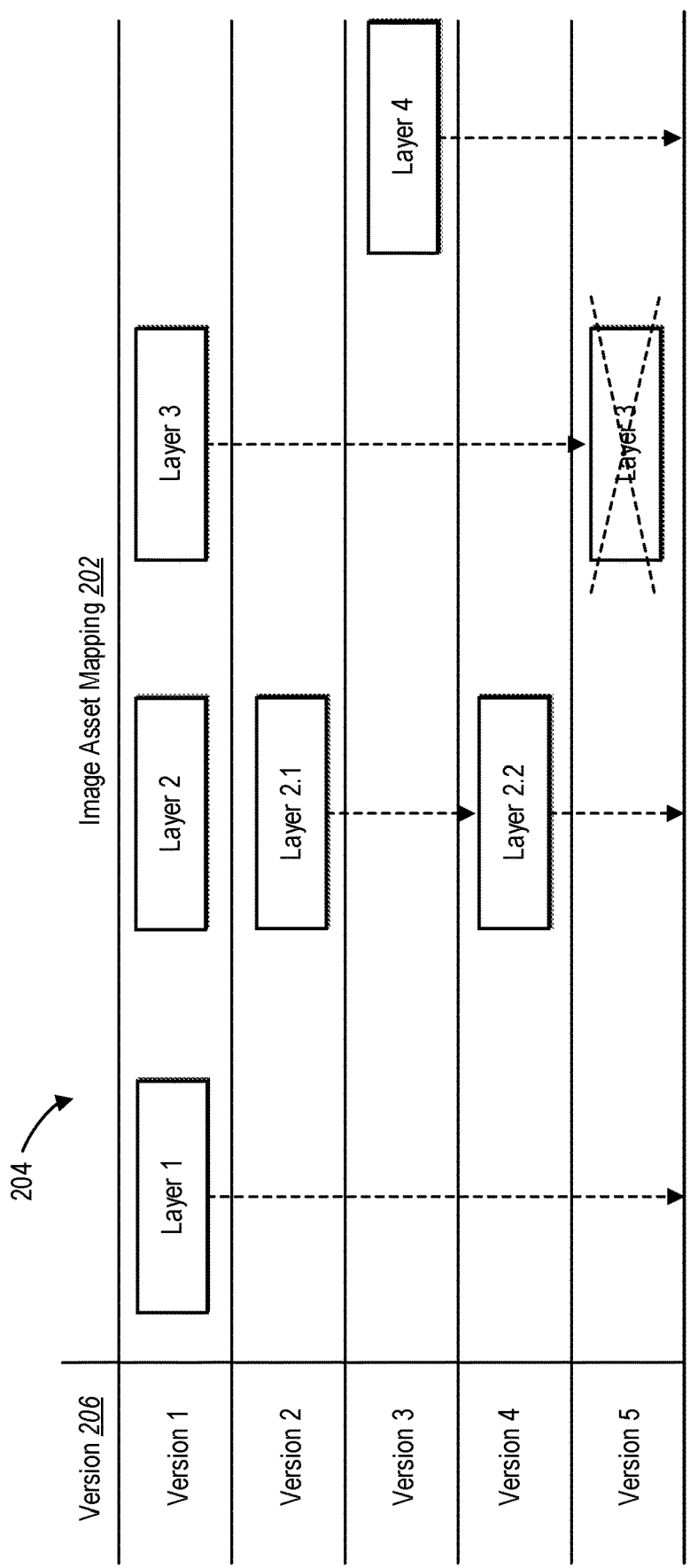
FIG. 2 illustrates example components associated with various versions of a digital asset in accordance with one or more embodiments.

Turning now to FIG. 2, additional description is now provided regarding the digital asset synchronization system creating and maintaining multiple versions of a digital asset. In particular, FIG. 2 illustrates layers (e.g., components) associated with various version mappings of a digital asset (e.g., a digital image). As shown in FIG. 2, each version 206 of the digital asset includes an image asset version mapping 202 (or simply "version mapping 202") having various layer components 204. In addition, each version mapping 202 in FIG. 2 can represent an example image asset mapping 102a from FIG. 1 that maps components (i.e., components 104) to an identifier and a file location. For instance, each version mapping 202 references components 204 that make up a particular version 206 of the digital asset.

To illustrate, FIG. 2 shows that Version 1 of the digital image has a version mapping 202 that includes the components of Layer 1, Layer 2, and Layer 3. In this manner, when an application, such as a digital asset application, opens Version 1 of the digital image, the digital asset synchronization system provides the application with the version mapping 202 for Version 1, which enables the application to identify Layer 1, Layer 2, and Layer 3 as the components of Version 1, locate the files corresponding to these layers, and access these layers in the correct order, priority, or arrangement. In this manner, the application can display Version 1 of the digital image to a user as a single file. For purposes of explanation, the actions of identifying components, locating corresponding files, and accessing the files are simply referred to as accessing the layers for the remainder of FIG. 2.

When a user or an application modifies a component of the digital asset, the digital asset synchronization system copies the component being modified and applies the changes to the copied component. Then, the digital asset synchronization system updates the version mapping 202 to reflect the change in version 206 of the digital asset. As illustrated, Version 2 has a version mapping 202 that includes Layer 1, Layer 2.1, and Layer 3. In other words, the version mapping 202 for Version 2 includes the updated Layer 2, which is Layer 2.1, as well as the other remaining layers (i.e., Layer 1 and Layer 3). In particular, the digital asset synchronization system replaces the identifier of Layer 2 with the identifier of Layer 2.1.

The digital asset synchronization system, in one or more embodiments, generates a new version mapping 202 of the digital image each time a layer is modified. For example, when preserving a version history of the digital image, the digital asset synchronization system creates a copy of Version 1's version mapping 202 and replaces the identifier of Layer 2 with the identifier of Layer 2.1 within the copy, which then becomes the version mapping 202 for Version 2 of the digital image. In this manner, the version mapping 202 for Version 2 provides users or applications with access to layers that make up Version 2 of the digital image.

In some embodiments, rather than preserving a version history, the digital asset synchronization system replaces the current version mapping with the updated identifier and file location such that only one version mapping 202 of the digital image (e.g., the current version) is maintained. In these embodiments, the digital asset synchronization system can also remove all components not used in the current version, such as removing Layer 2, which is only used in a previous version of the digital image (e.g., Version 1).

It should be noted that when creating multiple versions of a digital asset, the digital asset synchronization system utilizes efficiencies from previous versions. For example, the version mappings for both Version 1 and Version 2 of the digital image access the same file for Layer 1 and Layer 3, rather than creating a full duplicate copy of every component/file or the digital asset. When a digital asset has a large number of components, the storage/processing/speed cost savings is not insignificant. These cost savings can lead to the same or faster processing times without requiring additional storage in a storage medium. In addition, as shown, the cost savings of not having to save full copies of each version further increase as the digital asset synchronization system creates additional versions of a digital asset.

As shown with Version 3, the digital asset synchronization system receives an additional layer to the digital asset. For example, a user, through an application, adds another layer (e.g., Layer 4) to the digital asset. In response to detecting a new layer, the digital asset synchronization system creates a new file to store the layer, assigns an identifier to the layer, and associates the new layer with its identifier and file. In addition, the digital asset synchronization system creates a new/updated version mapping 202 that includes the new layer, which the digital asset synchronization system associates with a new digital asset version 206. As illustrated, the version mapping 202 for Version 3 includes Layer 1, Layer 2.1, Layer 3, and Layer 4 and enables an application to access each of these layers and present Version 3 of the digital image to a user.

Version 4 of FIG. 2 illustrates the digital asset synchronization system receiving and updating the version mapping 202 for the digital asset based on receiving an update to Layer 2.1, shown as Layer 2.2. Further, Version 5 illustrates a version mapping 202 when the digital asset synchronization system has removed a layer from the digital asset. As shown, Version 5 of the digital image removes Layer 3 from the version mapping 202. For example, a user, through an application, deletes Layer 3 from the digital image. In response, the digital asset synchronization system creates a new version mapping that includes Layer 1.1, Layer 2.2, and Layer 4, but not Layer 3.

As mentioned above, in one or more embodiments, the digital asset synchronization system maintains a version history for a digital asset. For example, the digital asset synchronization system saves Versions 1-5 of the digital image shown in FIG. 2 along with each modified and newly created component/file. Further, the digital asset synchronization system keeps the component/file for Layer 3, such that user can access previous versions of the digital asset (e.g., Versions 1-4) that include Layer 3.

Just as an application can load a previous version mapping to access a previous version of a digital asset, in some embodiments, the digital asset synchronization system enables a user to access previous versions of a component itself. For example, if upon an application provides a user with Version 5 of the digital image, and the user desires to revert from Layer 2.2 to Layer 2.1 or Layer 2.0, then the digital asset synchronization system can enable such without affecting other layers of the digital image. In particular, the digital asset synchronization system enables the application to display Layer 2.1 or Layer 2 in place of Layer 2.2 without affecting Layer 4, which was added after Layer 2.1 was modified. For instance, in response to rolling back Layer 2.2 to Layer 2, the digital asset synchronization system creates a new version 206 (e.g., Version 6) having a version mapping 202 of Layer 1, Layer 2, and Layer 4. In this manner, the digital asset synchronization system enables a user to "undo" each component individually without affecting other components of a digital asset.

As previously discussed, the digital asset synchronization system can detect and apply updates based on one or more components of a digital asset being modified, which affects the mapping for the digital asset. In one or more embodiments, the digital asset synchronization system performs a step for modifying the mapping based on detecting an update to a first component of the digital asset such that the modified mapping defines an updated version of the digital asset. In additional to the description above, further description regarding detecting component updates and modifying digital asset mappings is provided below.

Figure 3:
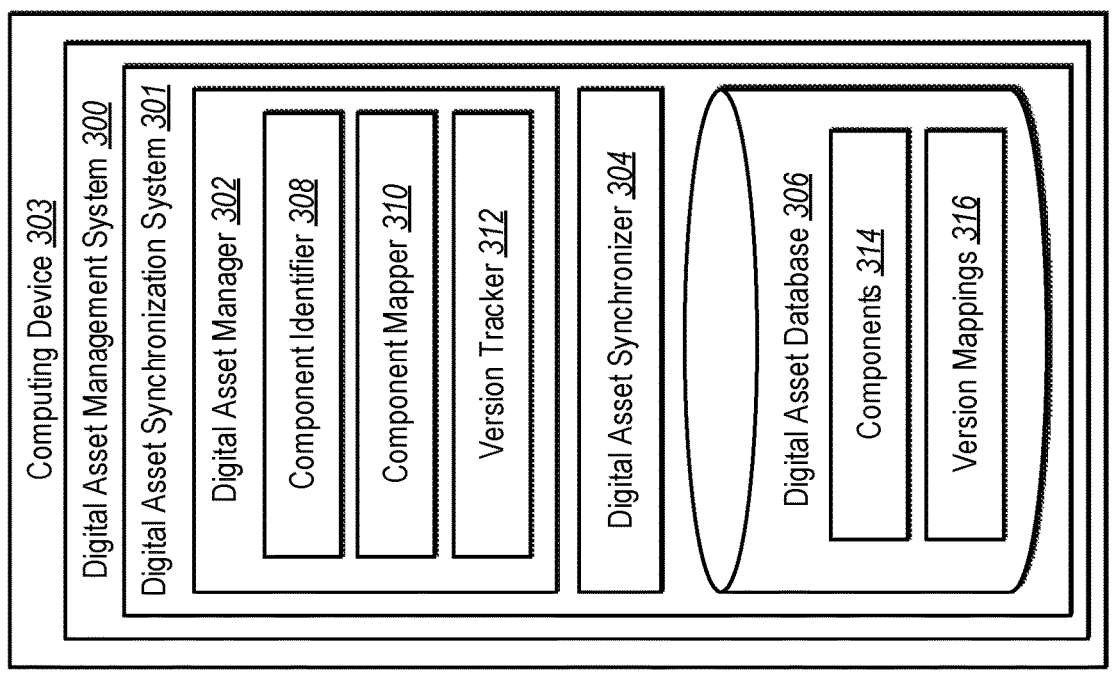
FIG. 3 illustrates an example schematic diagram of the digital asset synchronization system in accordance with one or more embodiments.

As mentioned above, a synchronization system can create, maintain, and manage digital assets including a digital asset mapping within a digital asset database. FIG. 3 illustrates an example digital asset management system 300 of which the digital asset synchronization system 301 (or simply "synchronization system 301") forms a part to aid in digital asset management. One or more computing devices 303 (e.g., a client device and/or a server device) can implement the digital asset management system 300.

In some embodiments, the digital asset management system 300 operates on both a client device and a server device that are in communication with one another, for example, to facilitate syncing digital assets between the devices. To illustrate, FIG. 4 below provides an example environment where a digital asset management system operates on a client device and a remote digital asset management system operates on a server device.

As shown in FIG. 3, digital asset management system 300 supports a digital asset synchronization system 301 that includes multiple elements. In particular, the digital asset synchronization system 301 includes a digital asset manager 302, a digital asset synchronizer 304, and a digital asset database 306. The digital asset manager 302 includes a component identifier 308, a component mapper 310, and version tracker 312. The digital asset database 306 includes components 314 and version mappings 316. The digital asset database 306 can include the example digital asset databases described above in connection with FIG. 1 and FIG. 2.

The digital asset management system 300 and the digital asset synchronization system 301 can comprise computer-executable instructions that, when executed by one or more computing devices cause the corresponding one or more computing device to perform a number of actions, as discussed in more detail below.

The digital asset manager 302 generally facilitates identifying, accessing, and modifying digital assets, including components of a digital asset. As part of this process, the digital asset manager 302 employs the component identifier 308. In general, the component identifier 308 identifies components of a digital asset. For example, when a user creates a new digital asset in an application, the component identifier 308 assigns an identifier to each component within the digital asset. In another example, the component identifier 308 identifies components from an existing digital asset, such as a digital asset received from another application or a remote source.

The component identifier 308 can determine which style of components to identify for a digital asset based on the digital asset's type. For example, the component identifier 308 accesses a lookup table that lists one or more component frameworks for each digital asset type. In one or more embodiments, a user provides input to change the default framework for a specific digital asset or for all digital assets having a particular type. In addition, a user can provide input specifying the framework granularity level of components for a digital asset or digital asset type (e.g., whether a text document has should divide components based on paragraphs, headings, sections, and/or pages). In some embodiments, the framework granularity is tied to the size of a digital asset (e.g., multiple documents divide components by page while single page documents divide components by paragraph).

The component identifier 308, in various embodiments, assigns an identifier to a component using an assignment algorithm that ensures each component is given a unique identifier. In some embodiments, the component identifier 308 uses the name/identifier of the digital asset to which a component belongs as part of the component's identifier. In various embodiments, the component identifier 308 increments the identifier of subsequent versions of a component, such that a subsequent version of a component references back to one or more previous versions of the component.

In one or more embodiments, the component identifier 308 identifies a component, in part, based on a hashing of the contents within the digital asset. In this manner, the identifier for each component also provides an indication of whether the component includes duplicative content. For example, the component identifier 308 can easily identify that two components (within the same or different digital assets) are identical. If so, the component identifier 308 can map both components to the same file, thus, further reducing storage space.

Further, by using hashes as identifiers, the component identifier 308 can determine when a component has been modified such that the component matches a previous version of the same component. To demonstrate, briefly returning to FIG. 2, if Layer 2.2 was an exact match to Layer 2, the component identifier 308 determines the same hash identifier for both layers. Upon detecting the match, the component identifier 308 maps Layer 2.2 to the file associated with Layer 2 rather than creating a new file.

In embodiments where the component identifier 308 does not use a hash of a component's contents to determine an identifier, the component identifier 308 can still hash the contents of a component and associate the hash with the component. For example, the component identifier 308 lists a component's hashing in the mapping or as metadata within the digital asset database 306. In this manner, the component identifier 308 can determine when components share the same content and can reference the same file within a storage medium.

As mentioned above, the digital asset manager 302 includes a component mapper 310. The component mapper 310, in general, generates mappings for a digital asset. More specifically, the component mapper 310 maps components to a digital asset as well as maps components to corresponding files. In this manner, the component mapper 310 lists the identifiers of each component in a digital asset within a mapping to indicate that the components make up the digital asset.

As part of listing components in a mapping, the component mapper 310 can assign an order (i.e., priority) to each listed component. The component mapper 310 can order the identifiers in the mapping based on a number of factors. For example, the component mapper 310 determines the order based on appearance arrangement in the digital asset (e.g., left-to-right, top-to-bottom, front-to-back, and/or beginning-to-end), framework hierarchy, identifier name, and/or creation/modification date. Further, as components of the digital asset change, the component mapper 310 add, remove, modify, or replace an identifier.

In addition, the component mapper 310 can map components to corresponding files. For example, as part of generating a mapping for a digital asset, the component mapper 310 connects an identifier of a component to a file that stores the content of the component. For instance, the component mapper 310 includes the file name and location within the mapping. Because a digital asset can have components with their content stored in files distributed across different locations and directories within one or more storage mediums, mapping each component to a file that stores its content enables applications to access each component of a digital asset and present the digital asset to a user as a monolithic file.

As described above, two or more components can include identical content. In these embodiments, the component mapper 310 maps multiple identifiers to the same file because the contents of the two components are identical. For example, when two components have matching content, the component mapper 310 includes the components separately in the digital asset mapping, but maps both components to the same file. In alternative embodiments, the component mapper 310 maps components with matching content to separate files, such as when the component mapper 310 forgoes checking the contents of each component to reduce processing needs on a computing device.

As shown in FIG. 3. the digital asset manager 302 also includes a version tracker 312. As described above, a digital asset is commonly associated with multiple versions. In embodiments where the digital asset synchronization system 301 maintains a version history for a digital asset, the version tracker 312 stores previous version mappings associated with the digital asset. For example, the version tracker 312 stores prior version mappings 316 of a digital asset as well as a list of files connected to components of those prior versions in the digital asset database 306.

In one or more embodiments, the version tracker 312 limits the number of stored prior version mappings based on a constraint. For example, the constraint can be time-based, such as all versions less than one week or one month old. In another example, the constraint is number-based, such as the three, five, or ten most recent version mapping. In a different example, the constraint is storage sized-based, such as fewer than 50 megabytes or less that 5% of the storage space on a storage medium (or a space allotted to the digital asset synchronization system 301).

Along similar lines, the version tracker 312 can discard former files that are linked only to version mappings being discarded. For example, if a file of video segment component is last referenced by an obsolete version mapping of a video asset, the version tracker 312 removes the file of the video segment component when removing the obsolete version mapping. Additionally, and/or alternatively, the version tracker 312 can routinely run a cleaning algorithm that removes unused files (e.g., "garbage collection") and discard those files that are not referenced by any stored version mappings.

As mentioned above, in some embodiments, the digital asset synchronization system 301 enables a user to revert a single component to a prior version without modifying other components of a digital asset. As such, the version tracker 312 can maintain a listing that associates current components with their previous versions. As part of this listing, the version tracker 312 tracks that file that corresponds to previous component version. As with the above, the version tracker 312 may store a limited number of files for previous versions of a component.

In one or more embodiments, the version tracker 312 is optionally included as part of the digital asset manager 302. For example, a synchronization system 301 may not include a version tracker 312 because the digital asset synchronization system 301 does not maintain version histories of digital assets on the client device. In these instances, the digital asset synchronization system 301 on the client device can remove previous version mappings and unused files. In some embodiments, the client device temporarily maintains previous version mappings and prior component versions, for example, until the digital asset synchronization system

301 on the client device syncs with a server device or a user quits an application accessing the digital asset.

A synchronization system 301 located on a server device, such as a remote digital asset synchronization system, can store the prior version mapping and corresponding files for digital assets. Thus, when a synchronization system 301 on a client device requests a prior version of a digital asset, the version tracker 312 on the remote digital asset synchronization system provides the client device with a version mapping corresponding to the request version and files missing on the client device. In addition, in some embodiments, a synchronization system 301 on a client device maintains a smaller number of prior version mappings than on a server device.

As shown in FIG. 3, the digital asset synchronization system 301 also includes a digital asset synchronizer 304. In general, the digital asset synchronizer 304 enables multiple users, applications, and/or devices to simultaneously access a digital asset. In addition, the digital asset synchronizer 304 facilitates synchronizing a digital asset between multiple devices, such as between multiple client devices and/or between a client device and a server device.

To demonstrate, in one or more embodiments, the digital asset synchronizer 304 detects when components of a digital asset are being accessed from multiple locations. For instance, the digital asset synchronizer 304 communicates with the digital asset database 306 to detect when one or more applications (or users or devices) are viewing and/or modifying components of a digital asset. For example, the digital asset synchronizer 304 recognizes a system call indicating that an application is requesting access to the digital asset database 306. Likewise, the digital asset synchronizer 304 determines when the application has finished accessing components of a digital asset.

The digital asset synchronizer 304, as mentioned, can detect when a modification occurs within a digital asset being accessed simultaneously by multiple applications (or users or devices). For example, the digital asset synchronizer 304 recognizes when the digital asset manager updates the digital asset mapping for a digital asset being simultaneously accessed. In some embodiments, upon detecting a change by a first application, the digital asset synchronizer 304 sends an indication (e.g., a direct message or multicast message) to the other applications to indicate that the mapping has been modified with the modified component. Alternatively, the digital asset synchronizer 304 indicates to the other applications that the digital asset mapping for the digital asset has changed, upon which the other applications can interface with the digital asset database 306 to locate and apply the change. Additional description regarding simultaneous access to a digital asset is provided in connection with FIG. 5 below.

In addition, the digital asset synchronizer 304, as mentioned, can also perform conflict resolution between multiple applications (or users or devices) modifying the same component of a digital asset. In general, when multiple applications access a digital asset, the applications infrequently modify the same component at the same time; rather the applications modify different components. As described in the above paragraph, the digital asset synchronizer 304 facilitates updating each application to display a component modified by another application simultaneously accessing the same digital asset at the same time.

In the instance that multiple applications modify the same component at the same time, the digital asset synchronizer 304 can resolve the conflict within the digital asset. In one or more embodiments, the digital asset synchronizer 304 resolves the conflict by creating one or more additional components that include the conflicting modifications. For example, if App 1 and App 2 both make a modification to Layer 1 of a digital image, the digital asset synchronizer 304 replaces the original pre-modified Layer 1 with both Layer 1 from App 1 and Layer 1 from App 2 within the mapping. Alternatively, the digital asset synchronizer 304 also includes the original pre-modified Layer 1 in addition to both Layer 1 from App 1 and Layer 1 from App 2 in the mapping for the digital asset.

A user, upon viewing the modified digital image, will likely detect that the digital image includes more than one version of Layer 1. In response, the user can correct any error by removing, editing, or merging one or more of the layers. Alternatively, the digital asset synchronizer 304 can create one or more versions of the digital image that each includes a version of Layer 1. Additional description regarding solving conflicts between a component of a digital asset is provided in connection with FIG. 7 below.

In addition, the digital asset synchronizer 304 performs synchronizations between multiple client devices and/or between a client device and a server device. In a number of embodiments, a digital asset is synchronized across multiple devices. The digital asset synchronizer 304 detects component modifications (as described above) and sends (i.e., pushes) modified version mappings and corresponding missing files to other devices. In addition, the digital asset synchronizer 304 can requests (i.e., pulls) version mappings and missing files from other devices. Additional description regarding transmitting components of a digital asset is provided in connection with FIG. 6 below.

As shown in FIG. 3, the digital asset synchronization system 301 includes the digital asset database 306. One will appreciate that, in some embodiments, the digital asset database 306 is located apart from the digital asset synchronization system 301, such as on a separate computing device. As illustrated, the digital asset database 306 includes components 314 and version mappings 316. The components 314 can include corresponding files that store the content of the components. Alternatively, the components 314 indicate file locations of the corresponding files, which are stored in a separate location, such as in another storage medium of the computing device hosting the digital asset synchronization system 301.

The digital asset database 306 can provide transactional guarantees to a user. As further described below, in one or more embodiments, the digital asset database 306 employs a multi-step process to record components and mappings for a digital asset to ensure data integrity. In addition, the digital asset database 306 can indicate when a particular component is in use by a user or application, which enables the digital asset synchronization system to more efficiently detect when changes occur to the component. Further, the digital asset database 306 can perform routine clean-up (e.g., garbage collection) to remove any components and/or files that are no longer in use (e.g., not referenced by either current or previous versions/mappings of digital assets).

In addition, the digital asset database 306 can be implemented using various protocols and designs. For example, the digital asset database 306 can comprise a SQL or SQLite database. As another example, the digital asset database 306 is a Mongo or other type of database. Further, as mentioned, the digital asset database 306 can be stored locally on a client device or as part of cloud-based storage.

The elements 301-316 of the digital asset management system 300 and can include software, hardware, or both. For example, the elements 301-316 can include one or more instructions stored on a computer-readable storage medium and executable by processors of one or more computing devices, such as a client device or server device. When executed by the one or more processors, the computer-executable instructions of the digital asset management system 300 can cause the computing device(s) to perform the feature learning methods described herein. Alternatively, the elements 301-316 can include hardware, such as a special-purpose processing device to perform a certain function or group of functions. Alternatively, the elements 301-316 of the digital asset management system 300 can include a combination of computer-executable instructions and hardware.

Furthermore, the elements 301-316 of the digital asset management system 300 may, for example, be implemented as one or more operating systems, as one or more stand-alone applications, as one or more modules of an application, as one or more plug-ins, as one or more library functions or functions that may be called by other applications, and/or as a cloud-computing model. Thus, the elements 301-316 may be implemented as a stand-alone application, such as a desktop or mobile application. Furthermore, the elements 301-316 may be implemented as one or more web-based applications hosted on a remote server. The elements 301-316 may also be implemented in a suite of mobile device applications or "apps." To illustrate, the elements 301-316 may be implemented in an application, including but not limited to ADOBE CREATIVE CLOUD software. "ADOBE," and "CREATIVE CLOUD" are either registered trademarks or trademarks of Adobe Systems Incorporated in the United States and/or other countries.

Figure 4:
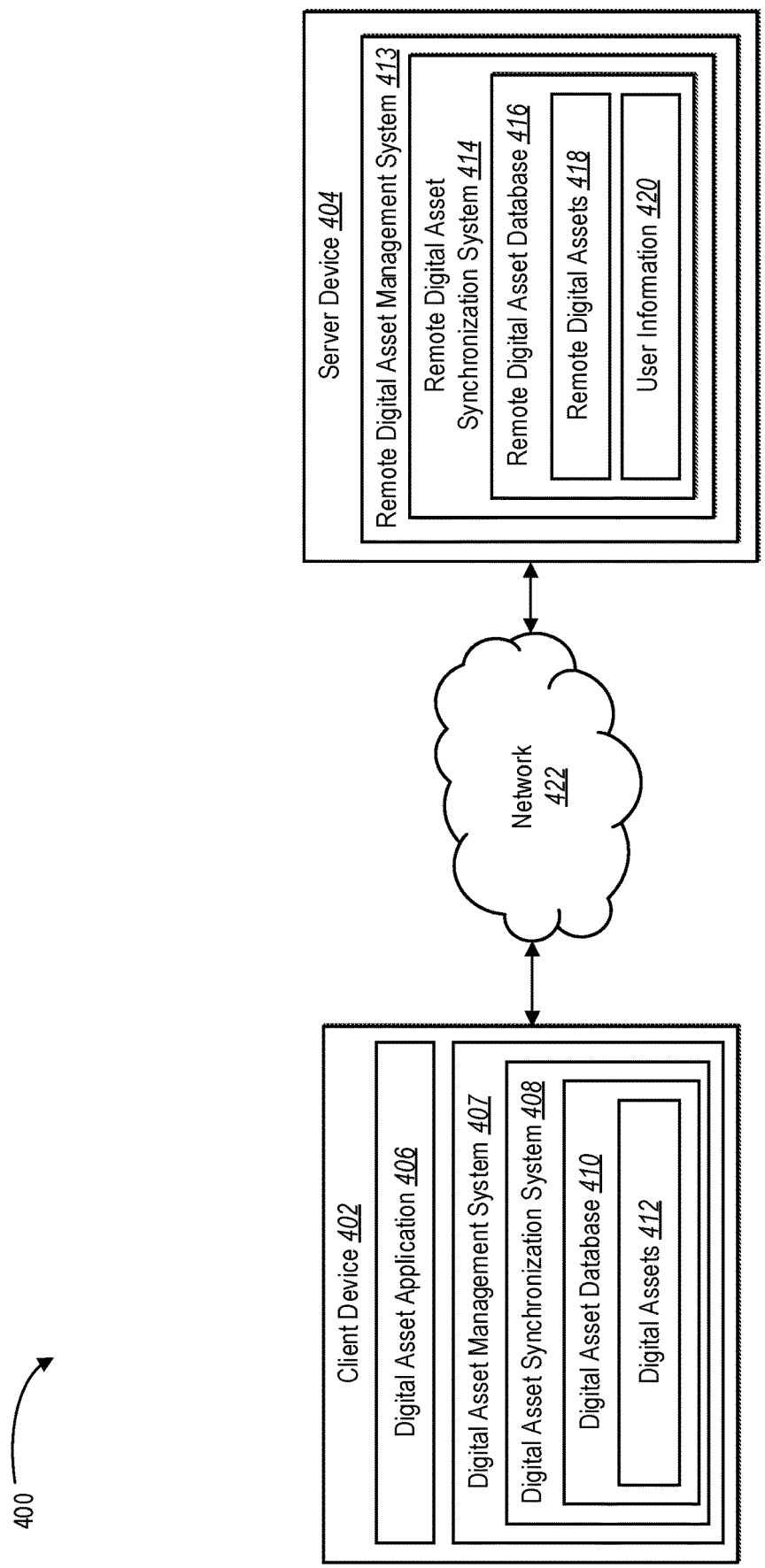
FIG. 4 illustrates a block diagram of an environment in which a digital asset synchronization system can operate in accordance with one or more embodiments.

As mentioned above, the digital asset management system 300 can reside on a client device, a server device, or both. To illustrate, FIG. 4 shows an environment 400 that includes both a client device 402 and a server device 404, each hosting a version of the digital asset management system. As shown, the client device 402 includes a digital asset management system 407 having a digital asset synchronization system 408, while the server device 404 includes a remote digital asset management system 413 remote digital asset synchronization system 414. The digital asset management system 407 and the remote digital asset management system 413 embody of the digital asset management system 300 described above in connection with FIG. 3. Likewise, both the digital asset synchronization system 408 and the remote digital asset synchronization system 414 embody of the digital asset synchronization system 301 described above in connection with FIG. 3.

As shown in further detail, the client device 400 includes a digital asset application 406 (or simply "application 406") and the digital asset database 410 (within the digital asset synchronization system 408/digital asset management system 407), which stores digital assets 412. The server device 404 includes the remote digital asset synchronization system 414 within the remote digital asset management system 413, which stores user information 420 and remote digital assets 418 (which correspond to the digital assets 412 on the client device 402).

As further illustrated, the client device 402 communicates with the server device 404 via a network 422. Although FIG. 4 illustrates a particular arrangement of devices and elements, various additional arrangements are possible. For example, the environment 400 can include any number of client devices.

The client device 402 may represent various types of client devices. For example, in some embodiments, the client device 402 may be a non-mobile device, such as a desktop or server, or another type of client device. In other embodiments, the client device 402 may be a mobile device, such as a mobile telephone, a smartphone, a PDA, a tablet, a laptop, a wearable device, etc. Additional details with respect to the client devices are discussed below with respect to FIG. 12.

In various embodiments, one or more users interface with the client device 402 to access digital assets, either directly on the client device 402 (e.g., digital assets 412), or remotely on the server device 404 (e.g., remote digital assets 418) via the network 422. As used herein, a user may be an individual (i.e., human user), a group, a business, or another entity. For example, co-workers using multiple client devices share a set of digital assets. In this example, each co-worker client device maintains an up-to-date copy of the shared digital assets, which synchronizes via the server device 404.

As shown in FIG. 4 and as mentioned above, the client device 402 includes an application 406. The application 406 can communicate with the digital asset management system 407 and the digital asset synchronization system 408 to access one or more of the digital assets 412 in the digital asset database 410. In general, an application enables a user to create, view, copy, modify, and/or delete a digital asset. In some cases, an application relates to a specific type of digital asset. For example, an application is a word-processing application that interfaces with digital documents. As another example, an application is an image editing/creating application that interfaces with digital images.

As mentioned, the application 406 accesses the digital assets 412. To demonstrate, the application 406 interfaces with the digital asset management system 407 and the digital asset synchronization system 408 to obtain a mapping for a digital asset. As described above, the application 406 uses the mapping to identify the components that make up the digital asset as well as the file locations where the content of those components are stored (as the components can be stored in files distributed across the client device 402). With access to the components, the application 406 presents (e.g., displays) the digital asset to a user as a single monolithic file.

As further mentioned, the application 406, in one or more embodiments, enables a user to modify (e.g., create, change, delete) one or more components of a digital asset. For instance, if the digital asset is an image having multiple layers, the application 406 enables a user to edit content within a layer. In addition, the application 406 can enable the user to add or remove layers. Upon the application 406 creating or modifying a digital asset, the digital asset management system 407 and the digital asset synchronization system 408 detect changes to the components of the digital asset, updates the mapping for the digital asset, and modifies one or more corresponding files, as described above.

The application 406, in some embodiments, can communicate with the remote digital asset management system 413 and the remote digital asset synchronization system 414 to directly access remote digital assets 418. For example, the application 406 provides (e.g., displays a preview of) one or more of the remote digital assets 418 to a user and enables the user to select a digital asset to fully display or modify within the application 406. Further, in some embodiments, the application 406 accesses previous versions of a digital asset and/or specific component from the remote digital asset database 416, such as when the digital asset database 410 on the client device 402 does not maintain previous versions of the digital asset, but the remote digital asset database 416 does maintain previous versions.

In one or more embodiments, the client device 402 includes multiple applications. For example, a user accesses the same digital asset simultaneously using two or more applications on the client device 402. As previously mentioned, when the user modifies the component within one application, the digital asset management system 407 and the digital asset synchronization system 408 cause the other applications to update to reflect the change in the digital asset.

When the client device 402 is synchronizing the digital assets 412 with the remote digital asset management system 413 and the remote digital asset synchronization system 414 on the server device 404, the application 406 can update, in real-time or near-real-time, the digital asset that a user is accessing. For example, a user is viewing a digital video using the application 406 on the client device 402, and another user updates the digital video at another client device. Upon the digital asset synchronization system 408 receiving the updated components (e.g., video segments, graphics, or titles), the digital asset management system 407 and the digital asset synchronization system 408 notify the application 406 of the updated components such that the application 406 can provide the updated digital video to the user. In some cases, the application 406 updates the digital video as the user is watching the video, without requiring additional action by the user.

The server device 404, as shown, includes the remote digital asset management system 413 and the remote digital asset synchronization system 414. The remote digital asset management system 413 and that remote digital asset synchronization system 414 can be embodiments of the remote digital asset management systems and the digital asset synchronization systems described above. For example, the remote digital asset synchronization system 414 includes a remote digital asset database 416 (or simply "remote database 416") that stores remote digital assets 418. The remote digital assets 418 are copies of the digital assets 412 stored on the client device 402. In other words, when full synced, the digital assets 412 stored on the client device 402 are also stored on the remote database 416.

In addition, the remote database 416 often includes more digital assets than found on a client device, in short, because the client device does not locally sync a user's entire digital asset collection. Generally, the server device 404 has a larger storage capacity than a client device, especially mobile client devices. For example, the remote database 416 can store a full collection of digital assets while a client device only maintains a partial collection. As another example, as a result of the additional storage capacity of the server device 404, the remote database 416 stores one or more previous versions of a digital asset (e.g., version mapping and component files) or a component as mentioned above. In this manner, the remote digital asset management system 413 and the remote digital asset synchronization system 414 can provide a previous version to a client device upon request.

The remote database 416, in one or more embodiments, also includes user information 420. For example, the remote database 416 maintains digital assets for a multitude of users. As such, the remote digital asset management system 413 and the remote digital asset synchronization system 414 associate each digital asset with one or more users that have rights to the digital asset. Because the remote digital asset management system 413 and/or the remote digital asset synchronization system 414 can store each component of a digital asset in files distributed across the remote database (or in another storage location), the remote digital asset management system 413 and/or the remote digital asset synchronization system 414 can store files from different users together. For example, the remote digital asset synchronization system 414 stores a first set of files from User 1 and User 2 together in a first directory and a second set of files from User 1 and User 2 in a second directory. As such, the remote digital asset management system 413 and/or the remote digital asset synchronization system 414 can use the user information 420 to identify components of a digital asset belonging to a particular user. In some instances, the remote digital asset management system 413 and/or the remote digital asset synchronization system 414 add the user information 420 to the mapping of a remote digital asset that is stored in the remote database 416

As a note, while only one server device 404 is shown in FIG. 4, one will appreciate that the remote digital asset management system 413 and the remote digital asset synchronization system 414 can operate across multiple server devices, or be located on separate devices. Further, while the remote digital asset synchronization system 414 and the remote database 416 are illustrated on the server device 404, in some embodiments, the remote database 416 is stored on a separate computing device, or set of computing devices. For example, the remote database 416 is distributed across a cloud-based storage network.

As described above, the client device 402 communicates with the server device 404 to synchronize digital assets. More specifically, the digital asset management system 407 and the digital asset synchronization system 408 on the client device 402 communicate with the remote digital asset management system 413 and the remote digital asset synchronization system 414 to share one or more digital assets. For example, the client device 402 sends (e.g., uploads) digital asset data including newly created digital assets, modified components (including digital asset mappings and modified files), and/or other data to the server device 404. Similarly, the client device 402 receives (e.g., downloads) corresponding digital asset data from the server device 404. Upon downloading digital asset data, the client device 402 can send a confirmation indication to the server device 404 indicating successful receipt of the digital asset data.

The client device 402 and server device 404, in one or more embodiments, exchange digital asset data in parallel. In other words, the client device 402 can both upload and download digital asset data together. Further, the server device 404, in some embodiments, synchronizes digital asset data between multiple client devices at the same time.

Figure 5:
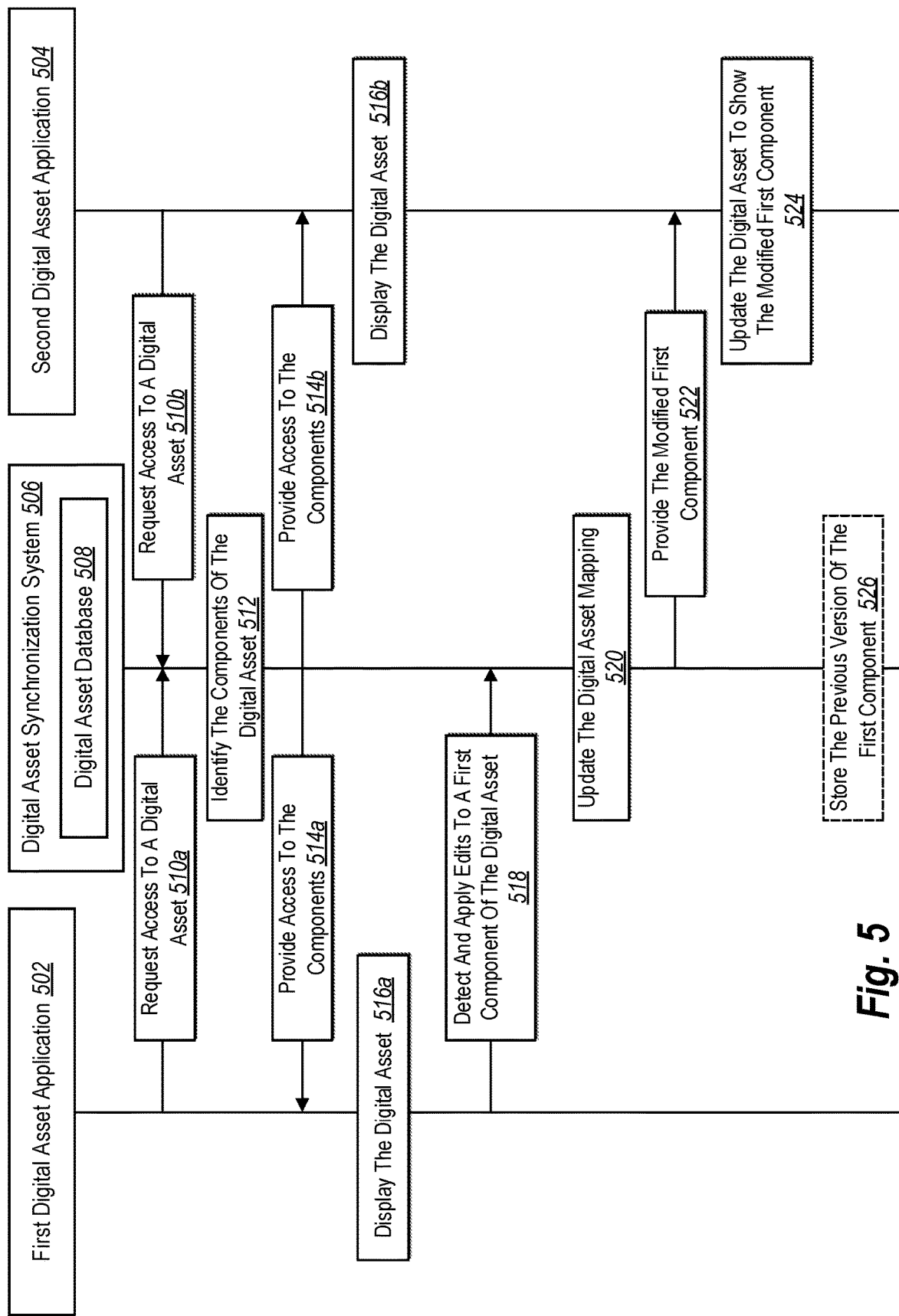
FIG. 5 illustrates a sequence diagram of multiple applications simultaneously accessing a digital asset in accordance with one or more embodiments.
Figure 6:
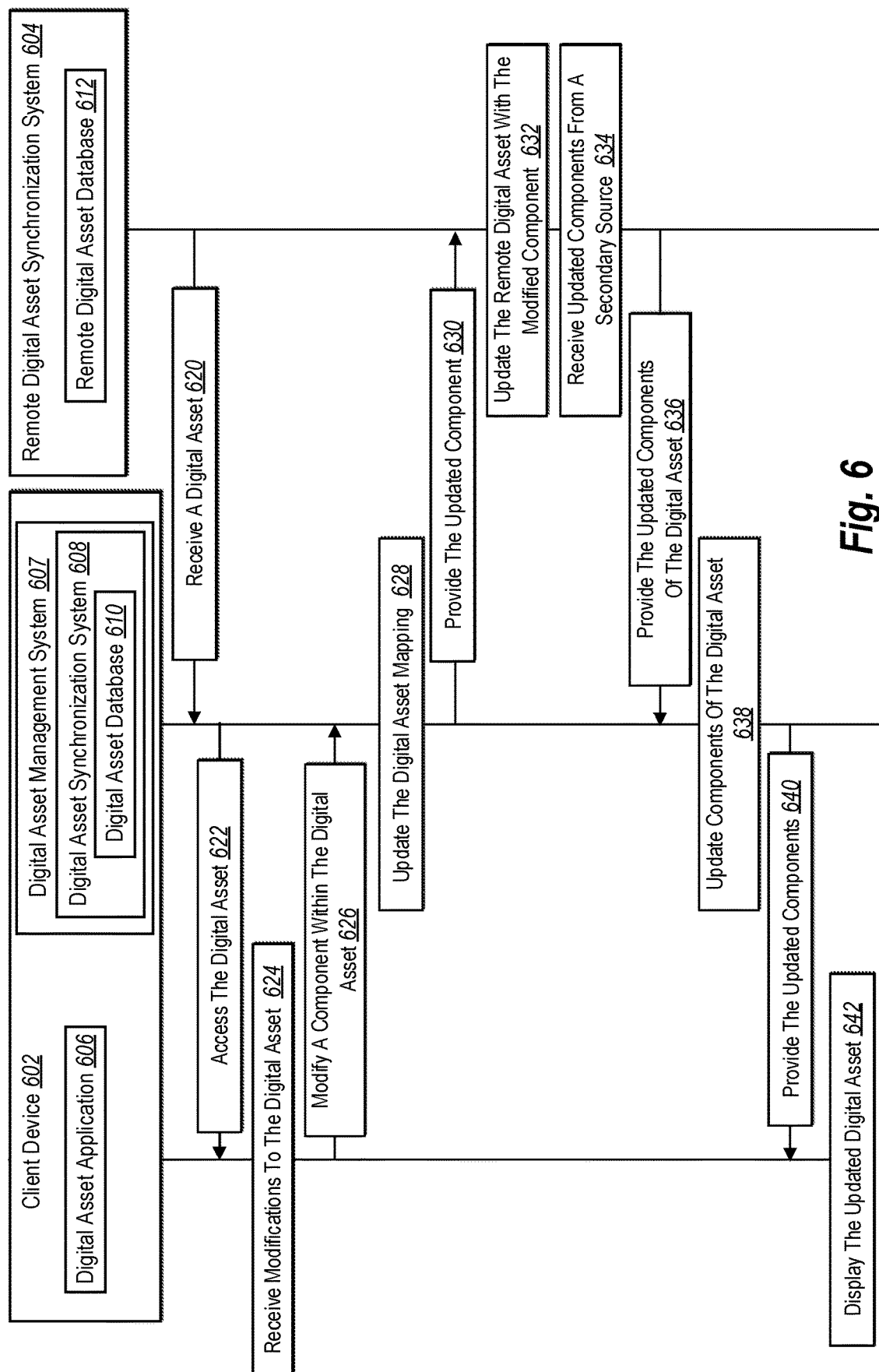
FIG. 6 illustrates a sequence diagram of efficiently transmitting components of a digital asset in accordance with one or more embodiments.
Figure 7:
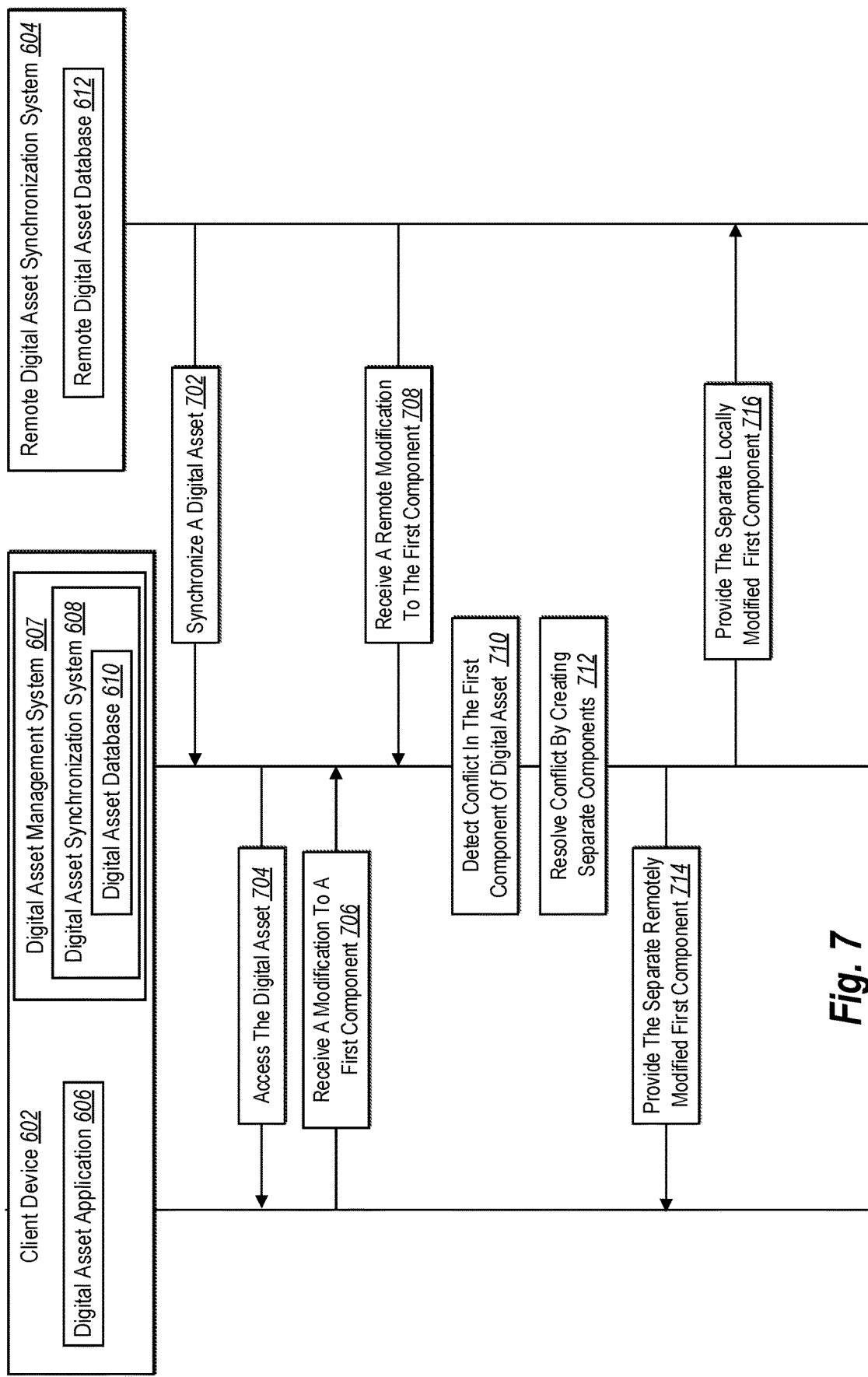
FIG. 7 illustrates a sequence diagram of resolving conflicts between a component of a digital asset in accordance with one or more embodiments.
Figure 8:
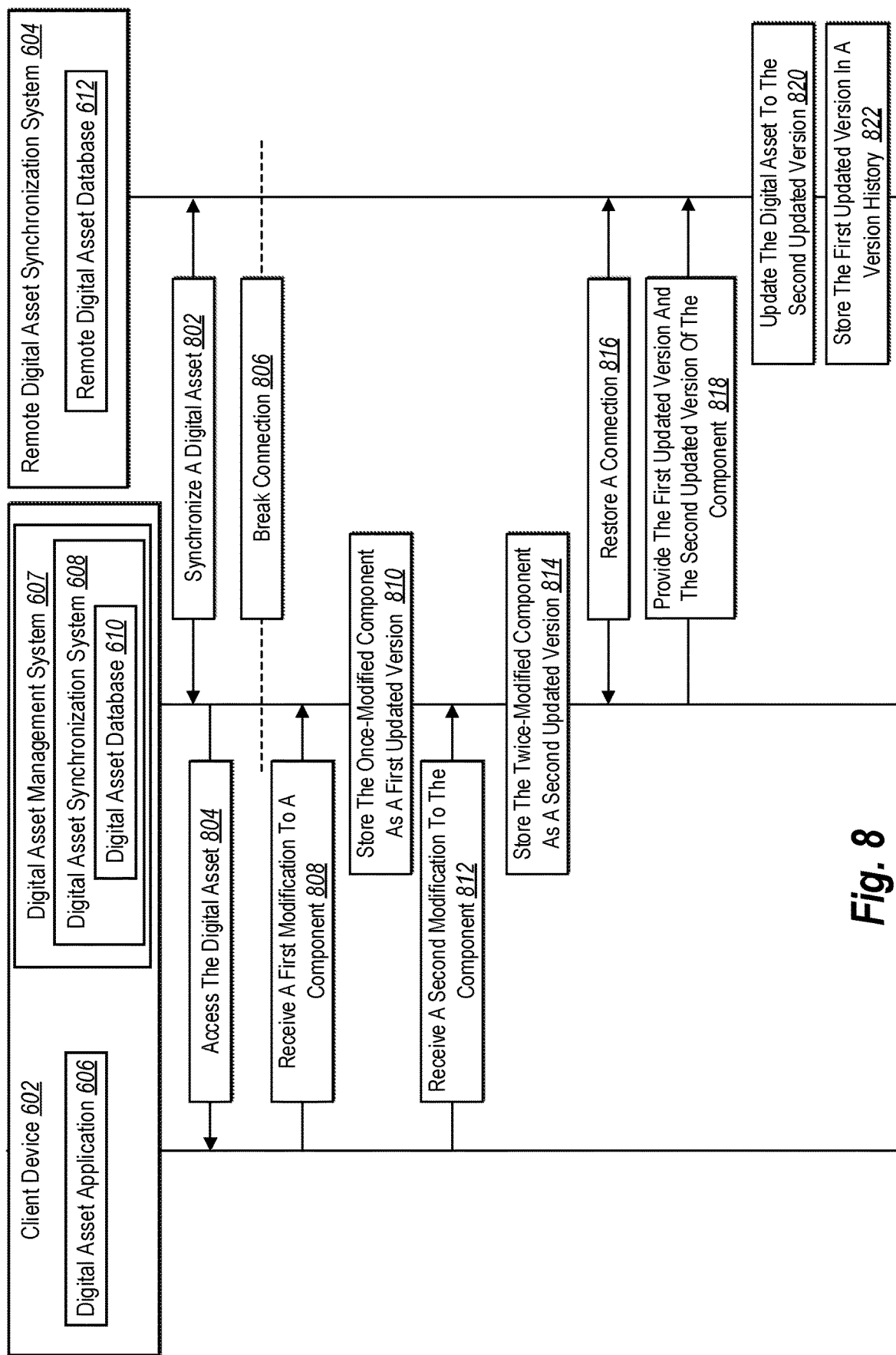
FIG. 8 illustrates a sequence diagram of managing simultaneous updates to the same component of a digital asset between a client device and a remote server in accordance with one or more embodiments.

As described above, FIGS. 1 and 2 illustrate a framework of a digital asset database and digital assets, while FIGS. 3 and 4 illustrate example embodiments of the digital asset management system and the digital asset synchronization system. Proceeding forward, FIGS. 5-8 illustrate example implementations of the digital asset management system and the digital asset synchronization system. In particular, FIG. 5 illustrates enabling concurrent accesses to a digital asset by multiple applications; FIG. 6 illustrates efficiently transmitting components of a digital asset; FIG. 7 illustrates the resolving conflicts between a component of a digital asset; and FIG. 8 illustrates managing simultaneous updates to the same component of a digital asset between a client device and a remote server.

As mentioned, FIG. 5 illustrates a sequence diagram of multiple applications simultaneously accessing a digital asset. As shown, FIG. 5 includes a first digital asset application 502 (or simply "first application 502"), second digital asset application 504 (or simply "second application 504"), and a digital asset synchronization system 506 (or simply "synchronization system 506") having a digital asset database 508. While not illustrated for simplicity, the digital asset synchronization system 506 can reside on a digital asset management system, as described above.

For explanatory purposes, FIG. 5 is described in the context of the first application 502, the second application 504, and the digital asset synchronization system 506 being co-located on a client device operated by a single user. One will appreciate, however, that other configurations yield similar outcomes as those described below. An example of another configuration is where the first application 502 and the second application 504 are located on different client devices, operated by the same or different users. Another example configuration is where one or both applications are located on a server device, which one or more users access through a client device. For instance, a web browser on a client device provides a user with access to a cloud-based application hosted on a server device. In another configuration, the digital asset synchronization system 506 can be hosted on a client device and/or a server device, as previously described.

As shown in FIG. 5, the digital asset synchronization system 506 receives requests from the each of the applications to access to a digital asset. In particular, the first application 502 requests 510a access to a digital asset. Likewise, the second application requests access 510b to the same digital asset. In particular, the first application 502 and the second application 504 each send a request to the digital asset synchronization system 506 that identifies the digital asset.

Upon receiving each of the requests, the digital asset synchronization system 506 identifies 512 the components of the digital asset. In particular, the digital asset synchronization system 506 looks up the digital asset's digital asset mapping within the digital asset database 508, which indicates the components that make up the digital asset. The mapping also includes file locations for each component, as each component has its content is stored in a separate file that can be distributed across a storage medium (e.g., the client device). Additional description of a digital asset mapping is provided above with regard to FIG. 1.

The digital asset synchronization system 506, upon identifying the components of the requested digital asset, provides access to the applications. As shown, the digital asset synchronization system 506 provides 514a the first application 502 with access to the components of the digital asset. Likewise, the digital asset synchronization system 506 provides 514b the second application 504 with access to the same components of the digital asset. For example, the digital asset synchronization system 506 facilitates the applications accessing the digital asset mapping.

By accessing the digital asset mapping, each application can locate and open each file that stores the content of each component. Further, each application can use the mapping to order each component within the application. To illustrate, FIG. 5 shows the first application 502 displaying 516a and the second application 504 simultaneously displaying 516b the digital asset. In particular, both the first application 502 and the second application 504 display the digital asset to the user as a monolithic file while simultaneously accessing the same component files.

In some embodiments, as described above, an application also enables a user to modify a digital asset. For example, the first application 502 provides tools that enable the user to add, remove, or edit components within the digital asset, as described above. To illustrate, the first application 502 detects and applies 518 edits to a first component of the digital asset. For instance, the first application 502 detects and applies changes to an image layer, document page, three-dimensional mesh, presentation page, video clip, spreadsheet cell, or sketchbook sheet in response to user input.

In one or more embodiments, the first application 502 creates a new component that includes the modified first component. Specifically, upon detecting the user changing (or saving a change) to a component (e.g., the first component), the first application 502 and/or the digital asset synchronization system 506 creates a new component that reflects the modifications made to the component within the first application 502. For instance, the first application 502 and/or the digital asset synchronization system 506 create a new file (e.g., using copy-on-write) that includes the modified contents of the first component. Further, the new file can be located in the same (or different) location as the file for the original first component. In alternative embodiments, the first application 502 directly edits the file associated with the modified component rather than creating a new file. As noted above, during the process of creating and storing the new component, neither the first application 502 nor the digital asset synchronization system 506 copy any other components of the digital asset.

In addition to creating a new component and corresponding file, the digital asset synchronization system 506 updates 520 the digital asset mapping of the digital asset. In particular, the digital asset synchronization system 506 replaces the identifier of the original first component in the mapping with an identifier assigned to the modified first component. In this manner, the mapping indicates that the digital asset includes the modified first component (and corresponding new file) rather than the original first component (and corresponding out-of-date/obsolete file).

In one or more embodiments, the digital asset synchronization system 506 employs a multi-step process of modifying the mapping with digital asset database 508. For example, upon detecting a change to a component, the digital asset synchronization system 506 informs the digital asset database 508 that a new file is being written at a specific location. Next, the first application 502 and/or the digital asset synchronization system 506 write the contents of the modified first component to the new file. Then, the digital asset synchronization system 506 confirms to the digital asset database 508 that the file has been written and is ready for use. In this manner, the digital asset synchronization system 506 can prevent a file-writing failure from causing the digital asset database 508 to reference an incomplete or missing file.

In some embodiments, the digital asset synchronization system 506 employs journaling (e.g., logging) to ensure that synchronization properly occurs. In general, journaling is the process of logging processes as they occur. In this manner, if a process is interrupted, the digital asset synchronization system 506 can restart the process using the last journal entry. In addition, a journal can indicate when one or more processes (including steps within a process) successfully complete. As such, the digital asset synchronization system 506 can use journaling to restart a process at the point of failure, which prevents duplicative transmissions and processes.

As shown in FIG. 5, the digital asset synchronization system 506 provides 522 the modified first component of the digital asset to the second application 504. For example, the digital asset synchronization system 506 sends an indication, such as a message or sub-process operating system call, to the second application 504 informing the second application 504 that the digital asset is updated. Alternatively, the first application 502 sends a direct or multicast message to the second application 504 indicating the update. In some embodiments, the digital asset synchronization system 506 directly indicates that the first component has been replaced with a modified component. In other embodiments, the digital asset synchronization system 506 indicates that the digital asset has been updated and the second application 504 determines from the mapping the components of the digital asset that have updated.

Further, the second application 504 updates 524 the digital asset to show the first modified component. For example, the second application 504 scans the updated mapping to determine that the first modified component has replaced the first modified component added. Further, the second application 504 locates the file (e.g., at the file location) containing the first modified component such that the second application 504 can display the modified first component respect to the other components of the digital asset. In this manner, the second application 504 displays an updated version of the digital asset to the user, which is the same updated version displayed to the user by the first application 502.

Optionally, the digital asset synchronization system 506 stores 526 the previous (i.e., original) version of the first component. As mentioned above, the digital asset synchronization system 506 can maintain version histories for a digital asset and/or individual components. In these cases, the digital asset synchronization system 506 stores previous digital asset mappings as well as the files storing the content of the previous components. Maintaining multiple versions of a digital asset is described above, for example, with respect to FIG. 2.

As mentioned, the digital asset synchronization system 506 can provide the original and modified version of the digital asset to a user by storing two mappings (e.g., the original mapping and modified mapping) and two versions of the first component (e.g., the original first component and the modified first component), along with the other components of the digital asset (of which only a single copy of each component is stored). In a similar manner, the digital asset synchronization system 506 enables a user to create copies of a digital asset without using twice the storage resources. For example, upon a user copying a digital asset, the digital asset synchronization system 506 creates a separate mapping for the copy, where the separate mapping references the same files used by the original digital asset. Then, if the user modifies the copy, the digital asset synchronization system 506 updates only the modified components, as provided above.

Turning now to FIG. 6, as mentioned above, FIG. 6 illustrates a sequence diagram of efficiently transmitting components of a digital asset. As shown, the sequence diagram includes a client device 602 and a remote digital asset synchronization system 604 (or simply "remote digital asset synchronization system 604"). As shown, the client device 602 includes a digital asset application 606 (or simply "application 606") and a digital asset management system 607 that includes a digital asset synchronization system 608 (or simply "synchronization system 608") having a digital asset database 610. The remote digital asset synchronization system 604 includes a remote digital asset database 612 (or simply "remote database 612"). While not illustrated, a server device having a remote digital asset management system, as described above can host the remote digital asset synchronization system 604. The elements shown in FIG. 6 can be example embodiments of corresponding elements described above.

In addition, while FIG. 6 shows a particular configuration of elements, one will appreciate that other configurations achieve similar outcomes as those described below. For example, the application 606 can be located on the remote digital asset synchronization system 604 (e.g., a cloud-based application as previously explained), rather than on the client device 602.

As shown in FIG. 6, the client device 602 receives 620 a copy of a digital asset. For example, the remote digital asset synchronization system 604 sends multiple digital assets to the client device 602 to initially sync a collection of digital assets between the devices. In particular, the remote digital asset synchronization system 604 provides a copy of all of the components and a digital asset mapping for the digital asset to the client device 602. In addition, the digital asset synchronization system 608 on the client device 602 can add the mapping to the digital asset database 610. In some embodiments, the digital asset synchronization system 608 updates part of the mapping to reflect the local file locations for components of the digital asset.

In some embodiments, if the client device 602 includes one or more components of the digital asset, the remote digital asset synchronization system 604 does not send those components. For example, one or more components of the digital asset belong to another digital asset already stored on the client device 602 (e.g., a jpeg file used in a number of documents and/or presentations). As such, the client device 602 updates the mapping for those components of the digital asset to reference the locally stored corresponding files. In this manner, the digital asset synchronization system 608 can provide further efficiencies by not transmitting files that include duplicative data. Likewise, when storing files on the remote digital asset synchronization system 604, the remote digital asset synchronization system 604 can detect when a file containing component content is duplicative (even across different users) and only store a single version a file.

After the client device 602 receives the digital asset, the digital asset synchronization system 608 provides one or more applications on the client device 602 with access to the digital asset. As shown, the application 606 accesses 622 the digital asset. The application 606 accesses the digital asset, including the components of the digital asset, as previously described. Further, the application 606 receives 624 modifications to the digital asset as well as modifies 626 a component within the digital asset, as also described above.

The digital asset synchronization system 608 updates 628 the digital asset mapping to reflect the modified component. In particular, the digital asset synchronization system 608 updates the digital asset database 610 to indicate that the component has been replaced with a modified version of the component, including changing the mapping for the digital asset to reference the new file created to store the contents of the modified component and no longer reference the file associated with the outdated or obsolete (e.g., pre-modified) component. In this manner, the digital asset synchronization system 608 updates the digital asset database 610 to reference the updated version of the digital asset.

In addition, as shown in FIG. 6, the digital asset synchronization system 608 provides 630 the updated component to the remote digital asset synchronization system 604. As mentioned, to provide an updated version of a digital asset to the remote digital asset synchronization system 604 (or another client device), the digital asset synchronization system 608 need only send components of the digital asset that have been modified. For example, if the digital asset includes a hundred components, and only five components change, the digital asset synchronization system 608 can send the five changed components to the remote digital asset synchronization system 604. The remote digital asset synchronization system 604 uses the five modified components and the other ninety-five components to arrive at the updated version of the digital asset.

In some embodiments, the digital asset synchronization system 608 also sends a modified digital asset mapping to the remote digital asset synchronization system 604 that defines the components included in the updated digital asset. For example, the updated mapping replaces the component with the modified component. Alternatively, the digital asset synchronization system 608 only sends the modified component, and the remote digital asset synchronization system 604 updates a remote mapping based on the modified component. For example, the remote digital asset synchronization system 604 detects that the modified component replaces the original component. In some instances, the modified component has a name or other identifier that indicates that it is an updated version of the original component.

As recently mentioned and as shown, the remote digital asset synchronization system 604 updates 632 the remote digital asset with the modified component. For example, the remote digital asset synchronization system 604 adds the modified component to a storage medium and replaces/modifies a remote mapping of the digital asset in the remote database 612 with an updated mapping received from the client device 602. In addition, in some embodiments, the remote digital asset synchronization system 604 sends a synchronization confirmation to the digital asset synchronization system 608, and, in response, the digital asset synchronization system 608 displays to a user that it is synchronized with the remote digital asset synchronization system 604.

Just as the digital asset synchronization system 608 can send single components of an updated digital asset to the remote digital asset synchronization system 604, the digital asset synchronization system 608 can also receive updated components from the remote digital asset synchronization system 604, such as another client device or based on a change to the digital asset made on a cloud-based service. To illustrate, FIG. 6 illustrates the remote digital asset synchronization system 604 receiving 634 updated components for the digital asset from a secondary source (e.g., a remote user, application, or client device). The updated components can include the modified component mentioned above. In addition, for purposes of explanation, the remote digital asset synchronization system 604 receives the updated components from the secondary source after fully synchronizing the modified component mentioned above.

Included in receiving the updated components from the secondary source, the remote digital asset synchronization system 604 can also update the remote database 612, as described above. For example, the remote digital asset synchronization system 604 stores the files corresponding to the updated components. Further, the remote digital asset synchronization system 604 further updates the remote mapping to include the updated component, reference the corresponding files, and archive obsolete components.

The remote digital asset synchronization system 604 then provides 636 the updated components to the client device 602. For instance, the remote digital asset synchronization system 604 pushes (i.e., transmits) the updated components to the digital asset synchronization system 608 on the client device 602. The remote digital asset synchronization system 604 can also provide an updated mapping that defines the most current version of the digital asset.

In response, the digital asset synchronization system 608 updates 638 components of the digital asset within the digital asset database 610 based on the received updated components. For example, the digital asset synchronization system adds new components, replaces modified components, and removes components from the mapping within the digital asset database 610. Likewise, the digital asset synchronization system 608 modifies, if needed, the file locations of the updated components within the mapping.

Upon updating the mapping, the digital asset synchronization system 608 provides 640 the updated components to the application 606. As mentioned above, in one or more embodiments, the digital asset synchronization system 608 sends a message to the application 606 indicating the change. In other embodiments, the application 606 detects a change to the digital asset database 610 including an update to the digital asset.

Regardless of how the application 606 detects that the digital asset database 610 has updated the digital asset, the application 606 identifies which components have changed and displays 642 the updated digital asset to the user. In some embodiments, if a component that a user is actively working with is updated, the application 606 and/or synchronization system 608 creates a separate copy of the component. Alternatively, the application 606 notifies the user that the active component is being modified based on receiving updated components from the secondary source.

Along these lines, when displaying an updated digital asset to a user that includes one or more updated components, the application 606 can provide an indication of which components are updated. For example, if the digital asset is a digital image and the application 606 provides a list of layers in a toolbar, the application 606 can bold (or otherwise indicate) which components in the digital asset have been recently updated.

In some embodiments, the application 606 (or the digital asset synchronization system 608) provides a user with metadata of one or more components. For example, the application 606 provides a user with a timestamp of the last update for a particular component, the device that last updated the component, the user that last updated the component, and the number of component versions. As an additional example, the application 606 indicates to the user whether prior versions of a component are located locally or remotely.

As a note, FIG. 6 illustrates a number of actions (e.g., 620-642) that occur between the client device 602 and the remote digital asset synchronization system 604. While the actions are provided, and described in sequential order for ease of explanation, one will appreciate that many of the actions can occur in parallel. For example, the actions of modifying and syncing the modified component of the digital asset (e.g., 624-632) occur at the same time as the actions of syncing and applying the updated components of the digital asset (e.g., 634-642). In this manner, the client device 602 both sends the modified component and receives the updated component at the same time.

As previously mentioned, when multiple users, applications, or devices each make an edit to a digital asset, the digital asset synchronization system 608 rectifies the edits. Often, the edits are made to different components of the digital asset. However, the digital asset synchronization system 608 occasionally detects when the same component is simultaneously changed at multiple locations. To illustrate, FIG. 7 shows a sequence diagram of resolving conflicts between the same component of a digital asset.

As shown, FIG. 7 includes the client device 602 and remote digital asset synchronization system 604 of FIG. 6. As such, the client device 602 includes the application 606 and the digital asset management system 607 that includes the digital asset synchronization system 608 having the digital asset database 610. The remote digital asset synchronization system 604 includes the remote database 612 (and can be hosted within a remote digital asset management system on a server device). As with FIG. 6, the concepts described in connection with FIG. 7 apply to multiple configurations besides the configuration shown.

As shown in FIG. 7, the digital asset synchronization system 608 and the remote digital asset synchronization system 604 synchronize 702 a digital asset, as previously described. Further, the application 606 accesses 704 the digital asset. Accessing the digital asset includes the application 606 displaying the components of the digital asset to the user as a monolithic file, as previously described.

Next, the digital asset synchronization system 608 receives 706 a modification to a first component of the digital asset. As such, the digital asset synchronization system 608 updates the digital asset database 610 to reflect the modified first asset, as described above. In this manner, the application 606 and the digital asset synchronization system 608 maintain an updated version of the digital asset. However, the digital asset synchronization system 608 will maintain the original version (e.g., the base version or base branch) of the first component on the client device 602 until the digital asset synchronization system 608 can successfully synchronize the updated versions (e.g., a first update branch) with the remote digital asset synchronization system 604.

Before the digital asset synchronization system 608 successfully synchronizes with the remote digital asset synchronization system 604 with the modified first component, the digital asset synchronization system 608 detects that another modification (e.g., a second update branch) to the first component has occurred. For example, the digital asset synchronization system 608 receives 708 a remote modification to the first component. As such, the digital asset synchronization system 608 currently stores three copies (e.g., the three branches) of the first component: the original copy, the locally modified copy, and the remotely modified copy.

Upon receiving the remotely modified component, the digital asset synchronization system 608 detects 710 a conflict in the first component of the digital asset. In other words, the digital asset synchronization system 608 identifies that the original copy of the first component was successfully synchronized with the remote digital asset synchronization system 604. As such the digital asset synchronization system 608 determines that the locally modified copy and the remotely modified copy are different branches from the original copy.

Upon detecting the conflict, the digital asset synchronization system 608 determines a resolution to the conflict. In one or more embodiments, the digital asset synchronization system 608 uses a three-way diff to solve the conflict. For example, the digital asset synchronization system 608 updates the mapping of the digital asset to include both the locally modified copy and the remotely modified copy. In another example, the digital asset synchronization system 608 adds the locally modified copy and the remotely modified copy of the first component to the mapping of the digital asset in addition to the original copy. Alternatively, the digital asset synchronization system 608 selects the most recent copy in the mapping, or the digital asset synchronization system 608 ignores the conflicting copies.

Of note, when employing a three-way diff (or another multi-way diff), the digital asset synchronization system 608 need only compare the conflicting components of the digital asset as opposed to the entire digital asset. This is a significant advantage that improves the function of a computing device. To demonstrate, when a file conflict arises in a conventional file management system, the conventional system must obtain three full copies of the conflicted file (e.g., the original version, a first modified version, and a second modified version). If these files are large, such as larger than 100 megabytes, a computing device must store full copies of each file version, even if most of the data is duplicative. Further, conventional systems do not merge these files, but rather leaves it to a user to figure out where the changes in each file occur, and which changes are the most current. This problem further compounds when a file includes additional conflicts.

In contrast, the digital asset synchronization system 608 maintains only conflicting components of a digital asset, which are generally small in size. In addition, as mentioned above, the digital asset synchronization system 608 can merge the conflicting components into a single digital asset, which enables a user to quickly recognize and correct any discrepancies. Merging the conflicting components into a single digital asset also reduces clutter on a user's computing device (e.g., the computing device displays a single file as opposed to multiple copies of a file). Further, because the conflicting components are small in size, the client device 402 uses less computational resources to identify and merge the file.

As shown in the illustrated embodiment, the digital asset synchronization system 608 resolves 712 the conflict by creating separate components for the locally modified copy and the remotely modified copy. For example, the digital asset synchronization system 608 replaces the original component in the mapping of the digital asset with one component for the locally modified copy and another component for the remotely modified copy.

Next, the digital asset synchronization system updates both the application 606 and the remote digital asset synchronization system 604 with the updated mapping. In particular, the digital asset synchronization system 608 provides 714 the separate remotely modified first component to the application 606, such that the application 606 adds the remotely modified first component to the existing locally modified first component. In this manner, the application 606 displays both modified versions of the first component to a user within the digital asset. Further, as described above, the application 606 can enable the user to remove, edit, or merge the two first components.

Similarly, the digital asset synchronization system 608 provides 716 the separate locally modified first component to the remote digital asset synchronization system 604. Because the remote database 612 includes a copy of the remotely modified first component, the digital asset synchronization system 608 need only send the locally modified first component to enable the remote digital asset synchronization system 604 to have the most current version of the digital asset. The remote digital asset synchronization system 604 can confirm the synchronization of the digital asset, at which point, the client device 602 can remove the original first component, if needed, to free up additional storage space.

FIG. 8, as mentioned above, illustrates a sequence diagram of managing multiple updates to components of a digital asset between a client device and a remote server. As shown, FIG. 8 includes the client device 602 having the application 606 and the digital asset management system 607. The digital asset management system 607 includes the digital asset synchronization system 608 having the digital asset database 610. The remote digital asset synchronization system 604 includes the remote database 612 (and can be hosted within a remote digital asset management system on a server device). As with FIG. 6, the concepts described in connection with FIG. 8 apply to multiple configurations besides the configuration shown.

As shown in FIG. 8, the digital asset synchronization system 608 and the remote digital asset synchronization system 604 synchronize 802 a digital asset, as previously described. Further, the application 606 accesses 804 the digital asset. Accessing the digital asset includes the application 606 displaying the components of the digital asset to the user as a monolithic file, as previously described.

Before or while the application 606 is accessing 804 the digital asset, the digital asset synchronization system 608 breaks 806 connection with the remote digital asset synchronization system 604. For example, the client device 602 works offline or moves outside of network coverage. In another example, a user on the client device 602 pauses synchronization with the remote digital asset synchronization system 604. Alternatively, the digital asset synchronization system 608 is configured to only periodically sync with the remote digital asset synchronization system 604. In any case, the disconnection represents the digital asset synchronization system 608 not actively synchronizing with the remote digital asset synchronization system 604 for a period of time.

While not actively syncing with the remote digital asset synchronization system 604, the digital asset synchronization system 608 receives 808 a first modification to a component of the digital asset. In response, the digital asset synchronization system 608 stores 810 the once-modified component as a first updated version of the digital asset. More specifically, as described above, the digital asset synchronization system 608 updates the mapping of the digital asset based on the once-modified component to define the first updated version of the digital asset. Further, the digital asset synchronization system 608 creates and/or stores a new file of the contents of the once-modified component.

Additionally, while not actively syncing with the remote digital asset synchronization system 604, the digital asset synchronization system 608 receives 812 a second modification to the component of the digital asset. In response, the digital asset synchronization system 608 stores 814 the twice-modified component as a second updated version of the digital asset. The digital asset synchronization system 608 can receive any number of modifications to the same component of the digital asset, either from the application 606 or from other applications, while not actively syncing with the remote digital asset synchronization system 604.

As shown, the digital asset synchronization system 608 restores 816 a connection with the remote digital asset synchronization system 604. For example, the client device 602 regains network access, or a user chooses to re-enable synchronization with the remote digital asset synchronization system 604. As such, the digital asset synchronization system 608 provides 818 the first updated version and the second updated version of the digital asset. For example, the digital asset synchronization system 608 provides a bulk transmission that includes multiple version updates. If the digital asset synchronization system 608 receives additional changes while not actively syncing with the remote digital asset synchronization system 604, for example, to other components, the digital asset synchronization system 608 can also send over those modified components as well in the bulk transmission.

In response, the remote digital asset synchronization system 604 updates 820 the digital asset to the second updated version that includes the twice-modified component. In addition, the remote digital asset synchronization system 604 also stores 822 the first updated version of the digital asset in a version history for the digital asset. In this manner, the remote digital asset synchronization system 604 creates prior versions for each modified component of the digital asset, even when the prior versions were created on a client device that was not actively in sync with the remote digital asset synchronization system 604. Further, a user can then access and recall a previous version of the digital asset from the remote digital asset synchronization system 604, even after the client device 602 removes the previous versions after syncing the modified components.

Figure 9:
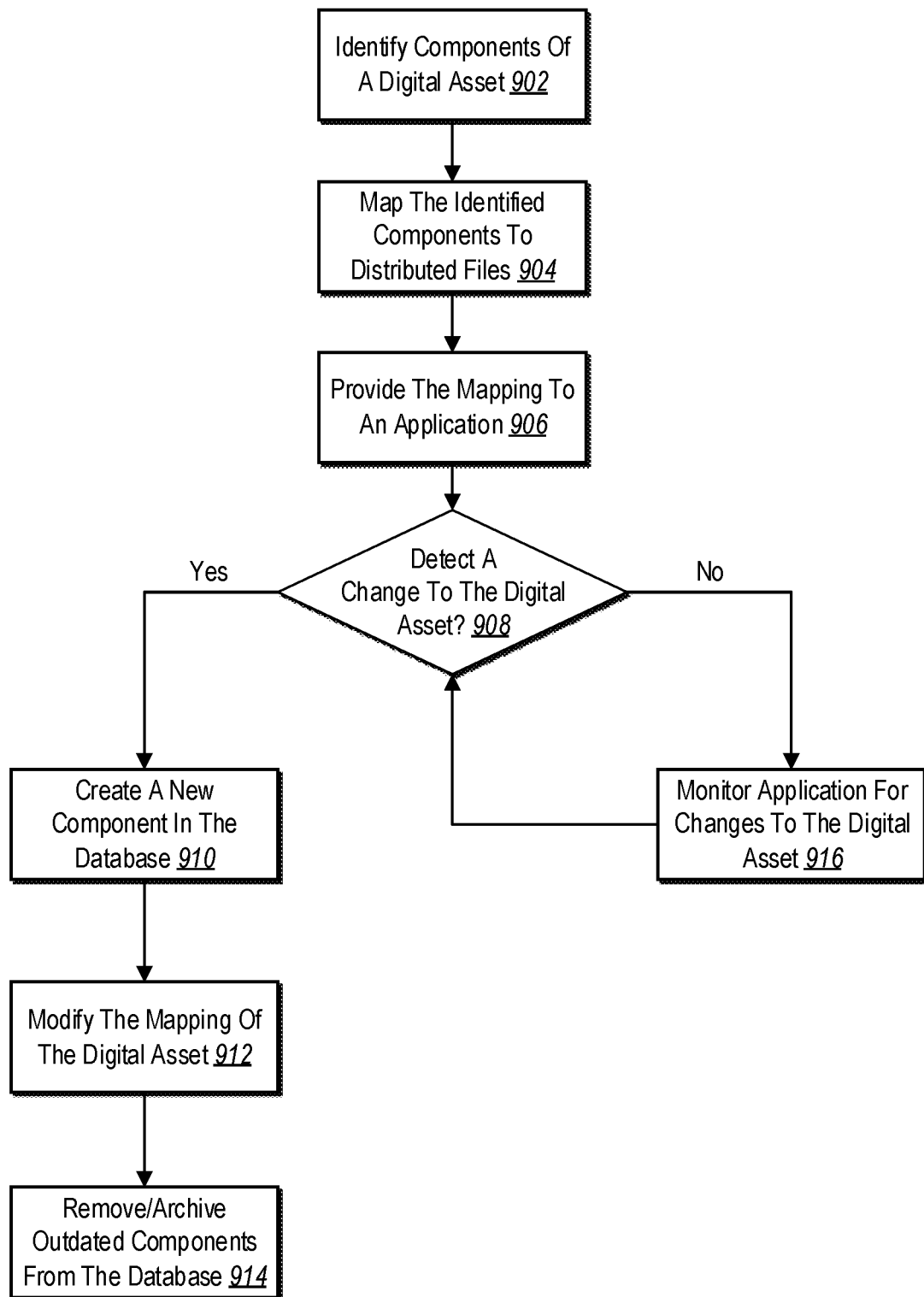
FIG. 9 illustrates a state diagram of the digital asset synchronization system generating and modifying a mapping for a digital asset in accordance with one or more embodiments.

FIG. 9 illustrates a state diagram 900 of the digital asset synchronization system performing a step for mapping, in a database, the identified components of the digital asset to corresponding files that are distributed across the database and a step for modifying the mapping based on detecting an update to a first component of the digital asset such that the modified mapping defines an updated version of the digital asset in accordance with one or more embodiments. The digital asset synchronization system can embody one or more embodiments of the digital asset synchronization systems described above. For example, the digital asset synchronization system is located on a digital asset management system.

As shown, the digital asset synchronization system identifies 902 components of a digital asset. In particular, the digital asset synchronization system identifies components that make up a digital asset. As described above, the digital asset synchronization system creates, receives, and/or replaces components that make up a digital asset. In some embodiments, the digital asset synchronization system identifies one or more components of a digital asset as residing in the digital asset database.

Next, the digital asset synchronization system maps 904 the identified components to distributed files. As described above, the digital asset synchronization system allocates identifiers to the components, creates independent files for each component in the digital asset database, and associates the identifies for the created files. Additional detail regarding and support for generating a mapping that maps the components to file is provided above in connection with FIGS. 3-5.

In addition, the digital asset synchronization system provides 906 the mapping to an application, such as a digital asset application. FIGS. 3-8 above, for example, described how the digital asset synchronization system provides and enables an application to use the mapping for the digital asset to identify the components of the digital asset and access the corresponding files that are distributed across the digital asset database. Upon accessing the files, the application displays the components of the digital asset to a user as a singular file.

The digital asset synchronization system detects 908 whether a change has occurred to the digital asset. For example, the digital asset synchronization system receives an indication from the application when the user provides input to change a component of the digital asset, as described above. For instance, a user interacts with the application to add, remove, or modify a component within the digital asset. In turn, the application notifies the digital asset synchronization system of the modification.

If the digital asset synchronization system detects a new component, the digital asset synchronization system creates 910 a new component in the database. As described above, when the application modifies a component, the digital asset synchronization system creates a copy of the component being modified (e.g., allocates a new identifier and new corresponding file) and applies any modifications to the component copy, which the digital asset synchronization system temporarily stores in the digital asset database. If the user creates a new component, the digital asset synchronization system creates a new component in the digital asset database. If the user deletes a component, the application indicates the deleted component to the digital asset synchronization system, and the digital asset synchronization system skips the step of creating a new component in the digital asset database.

After creating the new component in the database, the digital asset synchronization system modifies 912 to mapping of the digital asset. In short, when updating a component, the digital asset synchronization system modifies the mapping to reference the newly created component in place of the outdated component. If adding a new component to the digital asset, the digital asset synchronization system adds the new component to the mapping. If deleting a component, the digital asset synchronization system removes the component from the mapping. Additional description with respect to modifying the mapping of a digital asset is provided above in connection with FIGS. 3 and 6-8.

Upon modifying the mapping of the digital asset, the digital asset synchronization system removes/archives 912 the outdated component from the database. For example, the digital asset synchronization system on a client device deletes an outdated component from the digital asset database. In another example, the digital asset synchronization system on the cloud synchronization system archives the outdated component, which can be accessed when a previous version of the digital asset is requested. Additional detail regarding deleting/archiving an outdated component is provided previously.

If the digital asset synchronization system does not detect 908 a change to the digital asset within the application, the digital asset synchronization system monitors 916 the application for changes to the digital asset. As shown, the digital asset synchronization system can continuously monitor the application until a change to a component of the digital asset is detected. Alternatively, the digital asset synchronization system does not monitor the application, and the application provides a notification to the digital asset synchronization system when a change occurs.

FIGS. 1-9, the corresponding text, and the examples provide a number of different systems and devices of the digital asset synchronization system in accordance with one or more embodiments. In addition to the foregoing, one or more embodiments can also be described in terms of flowcharts comprising acts in a method for accomplishing a particular result. For example, FIGS. 10 and 11 illustrate flowcharts of exemplary methods in accordance with one or more embodiments described herein.

Figure 10:
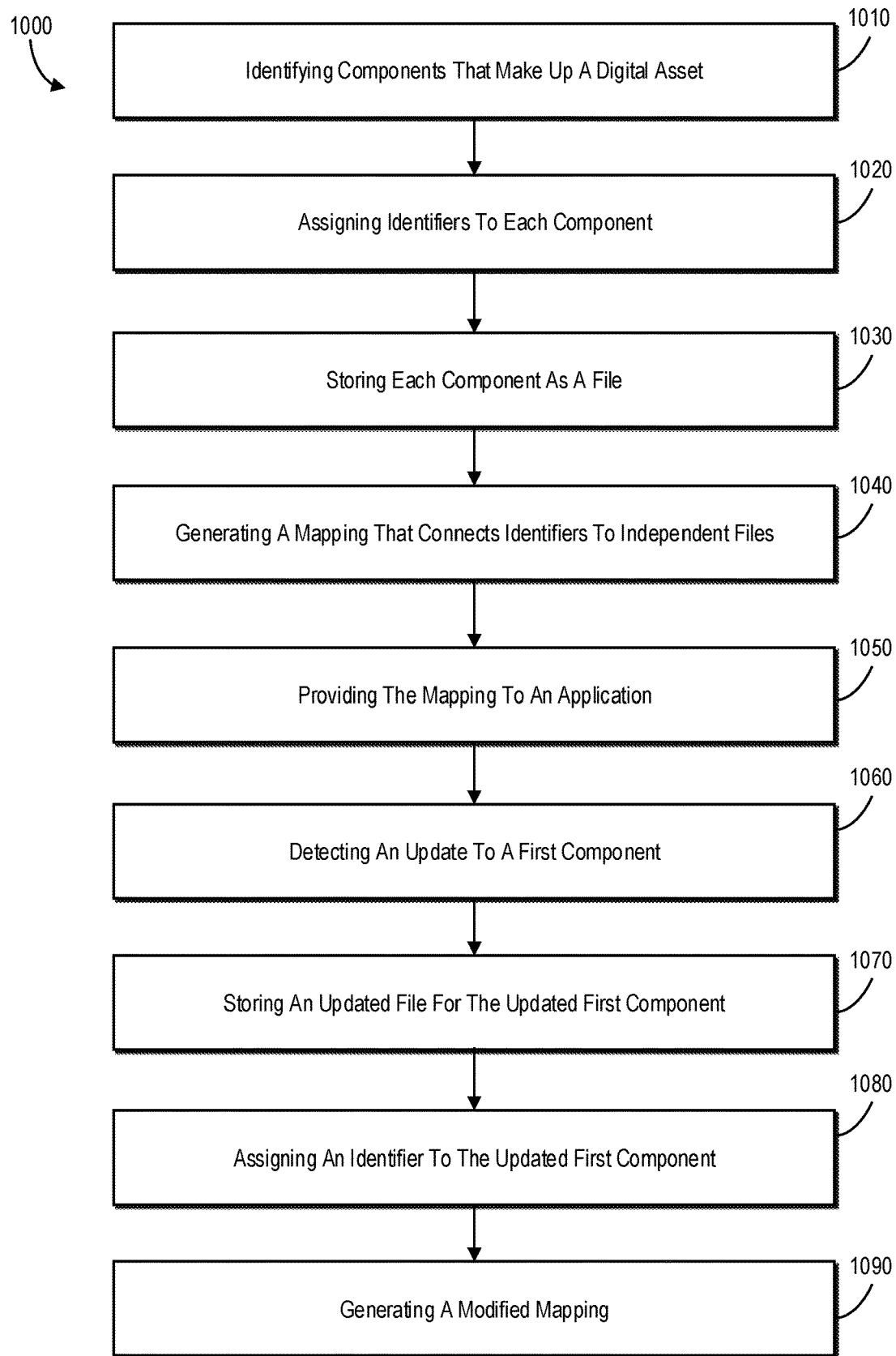
FIG. 10 illustrates an example flow diagram of a method for accessing the digital assets in accordance with one or more embodiments.
Figure 11:
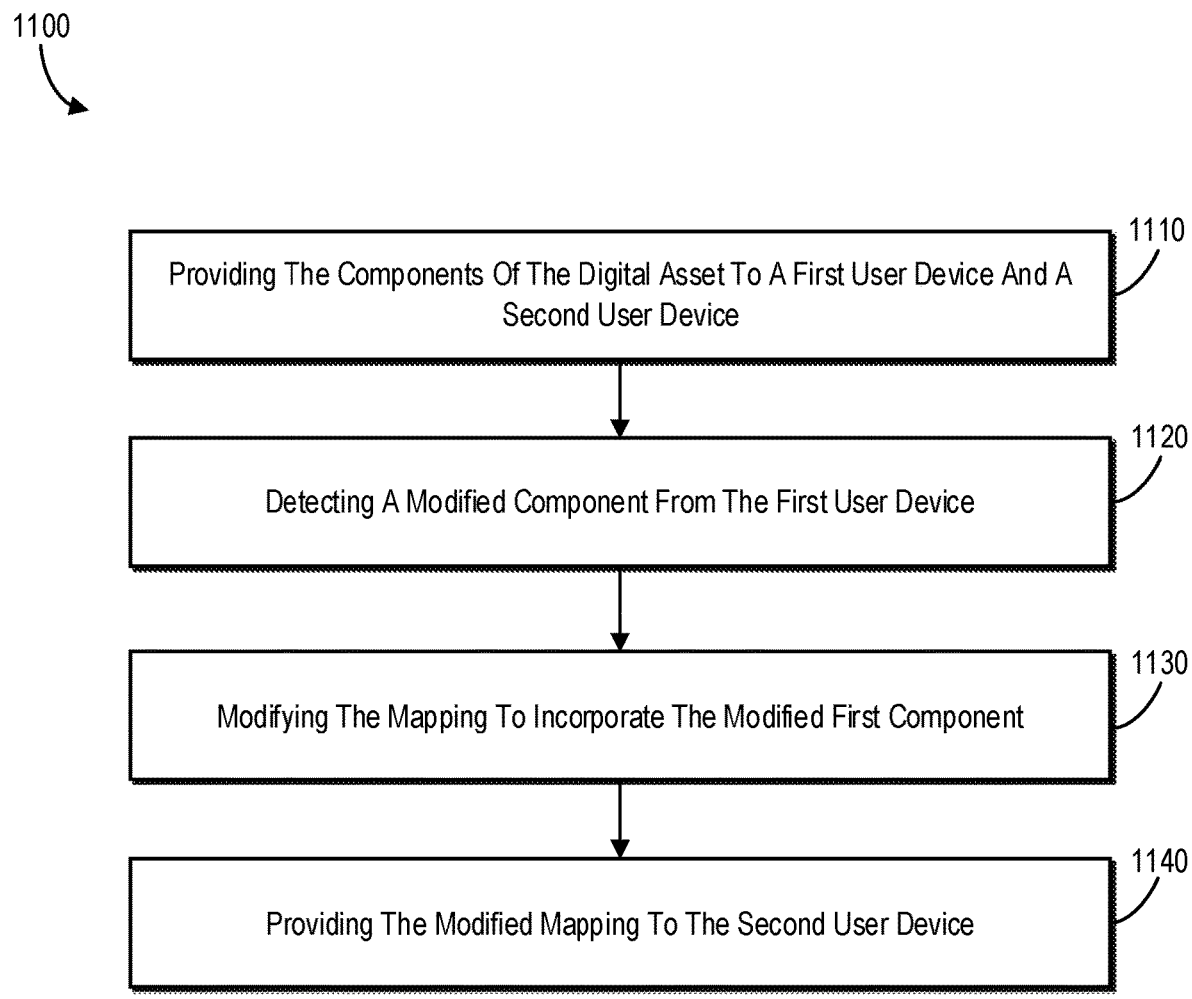
FIG. 11 illustrates an example flow diagram of a method for managing a digital asset across multiple user devices in accordance with one or more embodiments.

FIG. 10 illustrates an example flow diagram of a method 1000 for accessing the digital assets. In one or more embodiments, the method 1000 is implemented on one or more computing devices, such as a client device and/or a server device. Further, in some embodiments, the method 1000 is implemented in a digital environment for performing digital asset management on a cloud storage medium.

The method 1000 includes an act 1010 of identifying components 104 that make up a digital asset 412. For example, the act 1010 includes creating one or more components as part of creating a new digital asset. As another example, the act 1010 includes identifying components from an existing digital asset. In some embodiments, identifying the components that make up the digital asset include determining a file type associated with the digital asset, and identifying a framework for the components based on the determined file type. In various embodiments, the act 1010 also includes generating the components that make up the digital asset within the application.

The method 1000 also includes an act 1020 of assigning identifiers to each component 104 as well as an act 1030 of storing each component 104 as a file. In particular, the act 1020 can involve assigning identifiers to each of the components of the digital asset. The act 1030 can involve storing each of the components of the digital asset an independent file distributed across a storage medium. The storage medium can be stored on a user device (i.e., client device) or a server device (e.g., a cloud storage device).

As shown in FIG. 10, the method 1000 further includes an act 1040 of generating a mapping 102 that connects identifiers to independent files. In particular, the act 1040 can involve generating, within a database 100, a mapping 102 that connects each assigned identifier to a corresponding independent file. In some embodiments, the mapping represents a previous version of the digital asset and the modified mapping represents an updated version of the digital asset.

The method 1000 also includes an act 1050 of providing the mapping 102 to an application 406. In particular, the act 1050 can involve providing the mapping 102 to an application 406 such that the application 406 uses the mapping 102 to access each of the components 104 and display the digital asset as a monolithic file. In some embodiments, the application is located on a client device. In alternative embodiments, the application is a cloud-based application. In addition, the act 1050 can include using the mapping to order, prioritize, or arrange the components within the application.

As shown in FIG. 10, the method 1000 further includes an act 1060 of detecting an update to a first component. In particular, the act 1060 can involve detecting an update to a first component of the digital asset. For example, the act 1060 includes detecting that a user added, removed, copied, or otherwise modified a component of the digital asset via the application. In some embodiments, the application sends an indication of the update. In one or more embodiments, modifying a component of the digital asset causes changes to be made to the independent file associated with the one component without causing changes to be made to other independent files associated with other components of the digital asset.

Additionally, the method 1000 includes an act 1070 of storing an updated file for the updated first component. In particular, the act 1070 can involve storing, in response to detecting the update to the first component, an updated file for the updated first component. In one or more embodiments, the act 1070 also includes creating the updated file upon detecting the update to the first component of the digital asset that is separate from an independent file associated with the first component, where the updated file includes the updates made to the first component.

Further, the method 1000 includes an act 1080 of assigning an identifier to the updated first component. In some embodiments, the identifier is based on a hash of the contents of the updated first component. The identifier otherwise uniquely identifies the updated component from other components of the digital asset as well as from other components of other digital assets.

In one or more embodiments, the method 1000 includes an act 1090 of generating a modified mapping. In particular, the act 1090 can involve generating, within the database 100, a modified mapping that replaces an assigned identifier of the first component from the mapping 102 with the assigned identifier of the updated first component to connect the assigned identifier of the updated first component to the updated file. In addition, the act 1090 can include receiving, at a cloud storage server device, the updated file as part of detecting the update to the first component of the digital asset.

The method 1000 can also include additional acts. In one or more embodiments, the method 1000 includes the acts of providing the mapping to a first application to enable the first application to access the components of the digital asset while providing the mapping to a second application to enable the second application to simultaneously access the components of the digital asset, detecting the update to the first component based on the first application modifying the first component, and providing, in response to generating the modified mapping in the database where the modified mapping to the second application that causes the second application to replace access to the first component with access to the updated first component, and where the modified mapping causes the second application to display an updated version of the digital asset while the second application simultaneously maintains access to the database with the first application.

In some embodiments, the method 1000 includes the acts of detecting a first update to a second component based on a first application modifying the second component; detecting, before a second application receives a revised mapping indicating the first update to the second component, a second update to the second component based on the second application modifying the second component; determining that the first update to the second component conflicts with the second component by the second application; storing, in response to determining the conflict, a first file for the first update to the second component and a second file for the second update to the second component, where the first file is assigned a first identifier, and where the second file is assigned a second identifier; generating an updated mapping that replaces an identifier of the second component from the modified mapping with both the first identifier corresponding to the first file and the second identifier corresponding to the second file; and providing the updated mapping to the first application and the second application such the both the first application and the second application display the first update to the second component and the second update to the second component as separate components of the digital asset.

FIG. 11 illustrates an example flow diagram of a method 1100 for managing a digital asset across multiple user devices. In one or more embodiments, the method 1100 is implemented on one or more computing devices, such as one or more server devices. For example, the method 1100 is implemented on a server device that has a mapping that identifies components making up a digital asset, where each of the components of the digital asset are stored as independent files distributed across cloud storage, and where each component has a defined boundary within the digital asset and is modifiable without affecting other components of the digital asset.

As shown, the method 1100 includes an act 1110 of providing the components 114 of the digital asset to a first user device 402 and a second user device. In particular, the act 1110 can include providing the components of the digital asset to a first user device 402 as well as providing the components 114 of the digital asset to a second user device. A single user can operate both the first user device and the second user device. Alternatively, different users can each operated one of the user devices. In some embodiments, the act 1110 includes sending a copy of the components to the first user device to be stored on the first user device. In alternative embodiments, the act 1110 includes enabling remote access to the components within the cloud storage.

The method 1100 also includes an act 1120 of detecting a modified component from the first user device 402. In particular, the act 1120 can involve detecting, from the first user device 402, a modified first component of the digital asset. In one or more embodiments, the act 1120 includes detecting that the modified first component includes data indicating that the modified first component is a modified copy of the first component.

In addition, the method 1100 includes an act 1130 of modifying the mapping to incorporate the modified first component. In particular, the act 1130 can involve modifying, at the cloud storage database 416, the mapping to incorporate the modified first component, where the modified mapping defines a modified digital asset. In some embodiments, the act 1130 includes replacing the first component with the modified first component within the mapping of the digital asset.

Further, the method 1100 includes an act 1140 of providing the modified mapping to the second user device. In particular, the act 1140 can involve providing the modified mapping and the modified first component to the second user device. In one or more embodiments, the act 1140 enables the second user device to display the modified digital asset to a user associated with the second user device. More particularly, act 1140 can involve the modified mapping and the modified first component to the second user device without providing any unmodified components or the entire modified digital asset.

In some embodiments, the method 1100 also includes the acts of receiving, from the first user device, multiple updates to the first component of the digital asset in a bulk transmission; generating, for each received update of the multiple updates to the first component, a version mapping of the digital asset; and associating each version mapping of the digital asset with a previous version of the digital asset.

In various embodiments, the method 1100 also includes the acts of receiving a request from the first user device to access a previous version of the digital asset; identifying a previous mapping of the digital asset corresponding to the previous version; determining, based on the previous mapping, one or more previous components associated with the previous versions of the digital asset that are not associated with the modified mapping of the digital asset; and providing, in response to the request, the previous mapping and the one or more previous components to the first user device.

The term "digital environment," as used herein, generally refers to an environment implemented, for example, as a stand-alone application (e.g., a personal computer or mobile application running on a computing device), as a part of an application, as a plug-in for an application, as a library function or functions, as a server device, and/or as a cloud-computing system. A digital medium environment allows the digital asset synchronization system to perform digital asset management and synchronization between and across computing devices.

Embodiments of the present disclosure may include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, a general-purpose computer executes computer-executable instructions to turn the general-purpose computer into a special-purpose computer implementing elements of the disclosure. The computer executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 12:
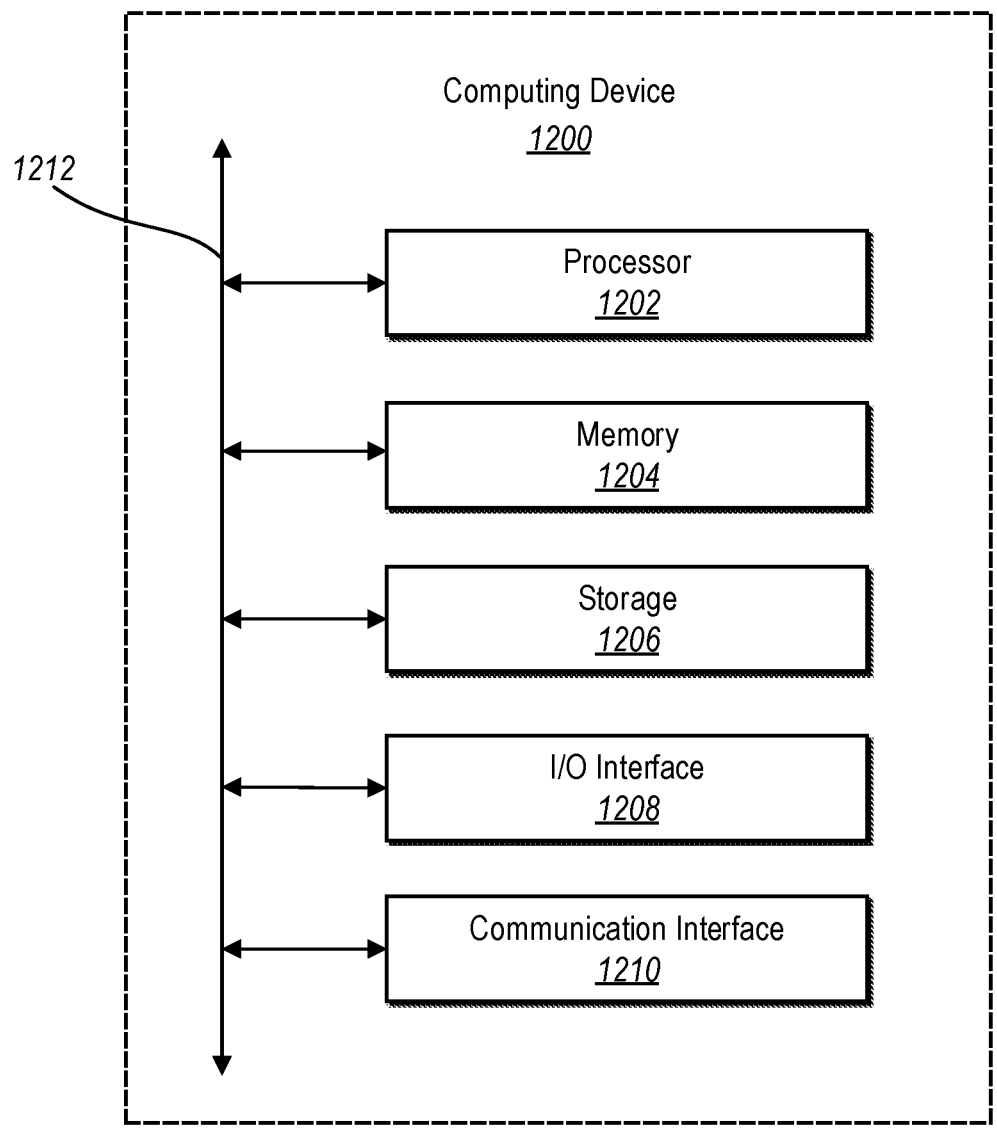
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the client devices and server devices described above. In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing capabilities.

As shown in FIG. 12, the computing device 1200 can include one or more processor(s) 1202, memory 1204, a storage device 1206, input/output ("I/O") interfaces 1208, and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that couples components of computing device 1200 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   maintaining, by one or more servers, a component mapping that maps components making up a digital asset;
   providing, by the one or more servers to a first computing device and a second computing device, simultaneous remote access to the digital asset;
   detecting a user modification by the first computing device to the digital asset that modifies a first component of the digital asset;
   storing a new component comprising a modified first component of the digital asset based on the user modification;
   generating an updated component mapping that maps the new component to the digital asset; and
   synchronizing the digital asset for the second computing device by providing the updated component mapping to the second computing device, which causes the second computing device to display an updated version of the digital asset comprising the new component reflecting the user modification.

2. The method as recited in claim 1, wherein providing, by the one or more servers to the first computing device and the second computing device, simultaneous remote access to the digital asset comprises:
   providing access to the digital asset to the first computing device via a first digital asset application; and
   providing access to the digital asset to the second computing device via a second digital asset application that differs from the first digital asset application.

3. The method as recited in claim 2, wherein the first digital asset application and the second digital asset application are cloud-based applications hosted by the one or more servers.

4. The method as recited in claim 3, wherein synchronizing the digital asset for the second computing device by providing the updated component mapping comprises providing the updated component mapping to the second digital asset application.

5. The method of claim 4, wherein providing the updated component mapping to the second digital asset application comprises sending a sub-process operating system call to the second digital asset application informing the second digital asset application that the digital asset has been updated.

6. The method as recited in claim 1, wherein synchronizing the digital asset for the second computing device comprises sending the updated component mapping and the new component to the second computing device without sending one or more additional component files that make up the digital asset.

7. The method as recited in claim 1, further comprising:
   journaling generation of the new component;
   determining that the generation of the new component is interrupted; and
   utilizing a last journal entry of the journaling to restart the generation of the new component at a point of failure to prevent duplicative generation of the new component.

8. The method as recited in claim 1, wherein:
   the digital asset comprises a digital image; and
   detecting the user modification by the first computing device to the digital asset that modifies the first component of the digital asset comprises detecting a modification to a layer of the digital image.

9. A non-transitory computer-readable medium storing instructions that, when executed by one or more servers, cause the one or more servers to perform operations comprising:
   maintaining a component mapping that maps components making up a digital asset;
   providing, to a first computing device and a second computing device, simultaneous remote access to the digital asset;
   detecting a user modification by the first computing device to the digital asset that modifies a first component of the digital asset;
   storing a new component comprising a modified first component of the digital asset based on the user modification by the first computing device;
   generating an updated component mapping that maps the new component to the digital asset; and
   synchronizing the digital asset for the second computing device by providing the updated component mapping to the second computing device, which causes the second computing device to display an updated version of the digital asset comprising the new component reflecting the user modification.

10. The non-transitory computer-readable medium of claim 9, wherein providing, the first computing device and the second computing device, simultaneous remote access to the digital asset comprises providing access to the digital asset via a cloud-based application hosted by the one or more servers.

11. The non-transitory computer-readable medium of claim 9, wherein the operations further comprise:
   detecting that the second computing device is actively editing the first component;

creating a separate copy of the first component; and
providing a notification to the second computing device that the first component is being modified by the first computing device.

12. The non-transitory computer-readable medium of claim 9, wherein the operations further comprise:
    detecting a conflict in the first component based on a user modification by the second computing device;
    creating a second new component file comprising a modified first component of the digital asset based on the user modification by the second computing device; and
    resolving the conflict by performing a three-way diff.

13. The non-transitory computer-readable medium of claim 9, wherein:
    the digital asset comprises a digital image; and
    detecting the user modification by the first computing device to the digital asset that modifies the first component of the digital asset comprises detecting a modification to a layer of the digital image.

14. The non-transitory computer-readable medium of claim 9, wherein the operations further comprise storing each of the components of the digital asset as separate files instead of storing the digital asset as a monolithic file.

15. A system comprising:
    one or more memory devices comprising a digital asset database having a mapping that maps components making up a digital asset to multiple locations across the one or more memory devices where the components are each stored as independent component files; and
    one or more servers configured to cause the system to:
        host a cloud-based application;
        provide to a first computing device and a second computing device, simultaneous access to the digital asset via the cloud-based application;
        detect a user modification by the first computing device to the digital asset that modifies a first component of the digital asset;
        store a new component comprising a modified first component of the digital asset based on the user modification in the one or more memory devices;
        generate an updated mapping that maps the new component to the digital asset; and
        synchronize the digital asset for the second computing device by providing the updated mapping to the second computing device, which causes the second computing device to display an updated version of the digital asset comprising the new component reflecting the user modification.

16. The system of claim 15, wherein providing the updated mapping to the second computing device comprises sending a sub-process operating system call informing the cloud-based application that the digital asset has been updated.

17. The system as recited in claim 15, wherein the one or more servers configured to cause the system to synchronize the digital asset for the second computing device by sending the updated mapping and the new component to the second computing device without sending one or more additional component files that make up the digital asset.

18. The system as recited in claim 15, one or more servers are further configured to cause the system to archive the first component in response to generation of the new component.

19. The system as recited in claim 15, wherein:
    the digital asset comprises a digital image; and
    the user modification by the first computing device to the digital asset that modifies the first component of the digital asset comprises a modification to a layer of the digital image.

20. The system as recited in claim 15, wherein one or more servers are further configured to cause the system to store each of the components of the digital asset as separate files instead of storing the digital asset as a monolithic file.

* * * * *